(12) United States Patent
Maimouni et al.

(10) Patent No.: US 11,945,930 B2
(45) Date of Patent: Apr. 2, 2024

(54) THREE-DIMENSIONAL SOLID POLYMERIC FOAMS AND A MICROFLUIDIC PROCESS TO DESIGN THEM

(71) Applicants: PARIS SCIENCES ET LETTRES, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLE DE LA VILLE DE PARIS, Paris (FR)

(72) Inventors: Ilham Maimouni, Paris (FR); Maria Russo, Paris (FR); Janine Cossy, Paris (FR); Patrick Tabeling, Paris (FR)

(73) Assignees: PARIS SCIENCES ET LETTRES, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLE DE LA VILLE DE PARIS, Paris (FR)

( * ) Notice: Subject to any disclaimer, the term of this patent is extended or adjusted under 35 U.S.C. 154(b) by 551 days.

(21) Appl. No.: 17/066,815

(22) Filed: Oct. 9, 2020

(65) Prior Publication Data
US 2021/0108045 A1    Apr. 15, 2021

(30) Foreign Application Priority Data
Oct. 11, 2019  (EP) .................................. 19 306 334

(51) Int. Cl.
*C08J 9/35* (2006.01)
*C08J 3/24* (2006.01)
*C08J 9/00* (2006.01)

(52) U.S. Cl.
CPC . *C08J 9/35* (2013.01); *C08J 3/24* (2013.01); *C08J 9/0061* (2013.01); *C08J 2205/042* (2013.01); *C08J 2205/044* (2013.01); *C08J 2205/052* (2013.01); *C08J 2205/06* (2013.01); *C08J 2207/10* (2013.01); *C08J 2305/08* (2013.01)

(58) Field of Classification Search
CPC ..... C08J 9/35; C08J 3/24; C08J 9/0061; C08J 2205/042; C08J 2205/044; C08J 2205/052; C08J 2205/06; C08J 2207/10; C08J 2305/08; C08J 2201/026; C08J 2305/00; C08J 9/30
See application file for complete search history.

(56) References Cited

U.S. PATENT DOCUMENTS

| 4,230,759 A * | 10/1980 | Kauffman | ................ | B32B 3/30 |
| | | | | 427/264 |
| 2013/0115252 A1 * | 5/2013 | Wu | ......................... | A23L 5/23 |
| | | | | 426/89 |

FOREIGN PATENT DOCUMENTS

CN    102850576    *   1/2013

OTHER PUBLICATIONS

Machine translation of CN102850576 (Year: 2013).*
European Search Report dated Feb. 24, 2020 and Written Opinion in corresponding application No. 19 306 334.4; 6 pgs.
Andrieux Sebastien et al: "Highly ordered biobased scaffolds: From liquid to solid foams", POLYMER, vol. 126, Apr. 18, 2017 (Apr. 18, 2017), pp. 425-431, 8 pgs.
Andrieux, S. et al.: "Generation of solid foams with controlled polydispersity using microfluidics", LANGMUIR, vol. 34, Jan. 8, 2018 (Jan. 8, 2018), pp. 1581-1590, 10 pgs.
Ilham Maimouni et al: "Microfluidics Mediated Production of Foams for Biomedical Applications", MICROMACHINES, vol. 11, No. 1, Jan. 1, 2020 (Jan. 1, 2020), p. 83, 20 pgs.

* cited by examiner

*Primary Examiner* — Irina S Zemel
(74) *Attorney, Agent, or Firm* — Maier & Maier, PLLC

(57) ABSTRACT

Organic solid three-dimensional polymeric foams, a process for preparing the same, and use thereof, the foams includes a solid continuous phase and pores, wherein the foams have a pore size ranging from 50 nm to 200 µm and a volumetric fraction of the solid continuous phase is from 0.1 to 60%, with respect to the total volume of the foams, and a polydispersity index from 1 to 30%, the foams being ordered over a volume of at least 100 pores.

9 Claims, 6 Drawing Sheets

THREE-DIMENSIONAL SOLID POLYMERIC FOAMS AND A MICROFLUIDIC PROCESS TO DESIGN THEM

FIELD

The present invention concerns organic solid three-dimensional polymeric foams, a process for preparing the same, and use thereof.

BACKGROUND

Solid three-dimensional foams are important materials due to their outstanding mechanical, insulating, and shock absorbing properties. These materials find numerous applications, for instance in the fields of photonics, catalysis, cosmetics, or in the biomedical field. To date, such foams are well described in the literature. U.S. Pat. No. 8,399,530, for instance discloses a process of preparation of polymer foams having pore sizes in the range between 10 μm to a few millimeters.

Three-dimensional foams can be constituted from different materials such as metal, ceramics, or polymers such as polystyrene, polyolefins or starch. Foams based on organic polymers are of particular interest because of their specific properties, in particular related to biocompatibility.

Several techniques exist to prepare organic solid three-dimensional polymeric foams, such as foam injection molding, foam extrusion or thermoset reactive foaming. These methods have several drawbacks, notably with respect to the lack of control over the pore size distribution, the polydispersity index, and the pore connectivity. Recently, microfluidic processes have been implemented with success in the creation of these foams. The reason is that microfluidic technology provides excellent control of pore size, connectivity, and polydispersity.

Microfluidic processes include the initial formation of a liquid polymeric foam that is subsequently solidified, for example by cross-linking of the polymer. One of the main problems observed is the unwanted early initiation of the cross-linking step during liquid foam formation in the microfluidic chip. This leads to clogging of the microfluidic device, i.e. the microchannels. A consequence of intermittent clogging is flow-destabilization, leading to foams having random pore sizes, thus resulting in polydisperse foams. When the clogging is permanent, which is the most frequent case, the production stops. Clogging obviously renders the process unsuitable for large scale production. Clogging is a frequent event for foams having small pore sizes, i.e. smaller than 200 μm, requiring channels of small transverse dimensions, i.e. smaller than 200 μm and in particular smaller than 80 μm, for their production. Andrieux et. al. (polymer, 126, 2017, p. 425-431) have attempted to solve the problem of early cross-linking by cooling the mixture of the polymer and the cross-linking agent in an ice bath before use. Using this technique, foams having bubble-sizes comprised from 200 to 800 μm could be prepared. However, this technical solution cannot be transposed to foams having smaller bubble-sizes, i.e. smaller than 200 μm and in particular smaller than 100 μm. Indeed, in this case, the heat transfer between the solution and the walls of the microfluidic channels readily results in warming up of the solution in the microfluidic chip during microbubble formation. Thus, the solution sufficiently warms up whilst inside the chip, and unwanted cross-linking occurs, leading to clogging of the channels.

So heating of the liquids occurs in the microchannel, leading to crosslinking. This estimate is conservative: the flow is already heating up in the tubing, prior to its introduction in the microfluidic device. Even though the speed could be increased, considering the Poiseuille profile, close to the wall of the channel the fluid layers flow at extremely small speeds, which are thermalized at room temperatures, and therefore provide nuclei for crosslinking reaction.

In conclusion: it is not possible to escape from the starting of the crosslinking in the microdevice according to the technique disclosed by Andrieux, when preparing foams of small bubble-sizes, in particular bubble sizes lower than 100 μm.

Alternatively, the initially formed liquid polymeric foam can be solidified by supplying the solidifying agent separately from the polymer, such as a cross-linking agent after initial formation of the liquid foam. This allows in part to circumvent the clogging issue, but at the expense of homogeneity. Owing to poor mixing, the cross-linking agent has a non-homogeneous distribution within the foam. Thereby, regions are well cross-linked, others not. Regions are drained by capillarity, others not. As a result, pore sizes along with mechanical elastic modulus are heterogeneous. This is for instance the case for the foams disclosed by Andrieux et. al. (Langmuir, 2018, 34, p. 1581-1590). This heterogeneity gets worse when small pores, in particular smaller than 100 μm should be obtained.

Thus, a need for alternative modes of preparation of solid polymeric foams exists, in particular for the production of highly ordered foams having small pore sizes, in particular smaller than 100 prn, which cannot be produced, in particular in steady conditions, with the existing techniques.

BRIEF SUMMARY

One aim of the present invention is the provision of an organic solid three-dimensional polymeric foam, Another aim of the present invention is to provide an organic solid three-dimensional polymeric foam having homogeneous controlled pore sizes, characterized by a small polydispersity index.

Another aim of the present invention is to provide a process of preparation of organic solid three-dimensional polymeric foams.

Another aim of the present invention is to provide said process using natural, biocompatible polymers.

Yet another aim of the present invention is to provide a process allowing for control over the pore size and the polydispersity index.

Still another aim is to provide applications of organic solid three-dimensional polymeric foams, especially in the fields of photonics and biomaterials.

Yet another aim of the present invention is to provide large amounts of foam, in particular volumes of at least of 1 mm$^3$.

DETAILED DESCRIPTION

Figure 1:
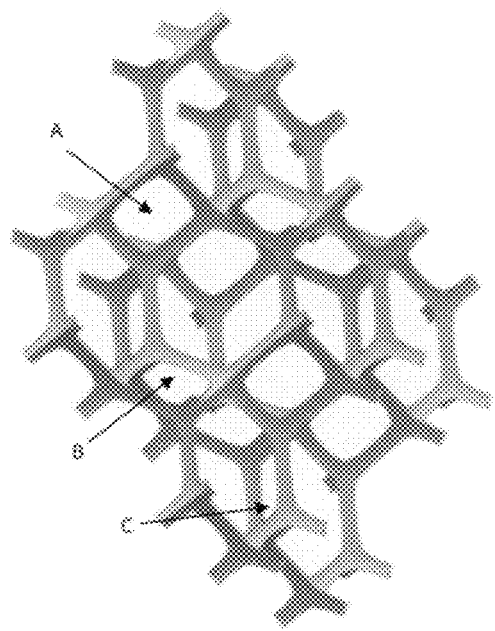
FIG. 1 represents a schematic example illustrating the structural components of a typical solid polymeric foam. A indicates the film, B indicates the plateau borders, and C indicates the nodes.

The inventors have carried out extensive research in order to solve the aforementioned technical problems.

The invention relies on the unexpected finding that controlling the process according to distinct steps enables the obtention of small pore sizes that were not able to be obtained up to now. Moreover, the process allows for complete control of the pore size and polydispersity index of the pores comprised within the foam. In addition, the foams can thus be obtained in quantities large enough to allow their use in applications. In fact, regarding to the general state of the art, a simple downscaling of the microfluidic devices known to the person skilled in the art is not sufficient to obtain the foams presented in the present application, due to premature cross-linking. A strict control of the temperature at each step of the microfluidic production is needed.

The present invention thus concerns an organic solid three-dimensional polymeric foam consisting of, or comprising a solid continuous phase and pores,
wherein said solid continues phase is a cross-linked organic polymer,
wherein said pores are separated by plateau borders, the meeting points of said plateau borders forming nodes,
wherein said foam has:
A pore size comprised from 50 nm to 200 µm, in particular from 50 nm to less than 10 µm, or from 10 to 200 µm,
a volumetric fraction of the solid continuous phase comprised from 0.1 to 60%, with respect to the total volume of the foam,
a flexibility/elasticity comprised from 10 to $10^7$ Pa,
a polydispersity index comprised from 1 to 30%,
wherein said solid three-dimensional polymeric foam is ordered over a volume of at least 100 pores.

The expression "organic solid three-dimensional polymeric foam" refers to a material comprising a solid continuous phase that is composed of an organic polymer, that is a polymer having carbon-carbon bonds in the backbone. In addition to carbon atoms the organic polymer can further comprise hydrogen atoms, or heteroatoms such as for example nitrogen, oxygen or phosphorous. Said organic polymer is a cross-linked polymer. The solid continuous phase can further comprise traces of solvents and/or residual reagents that were used for its preparation, such as for instance stabilizing agents.

The organic solid three-dimensional polymeric foam further comprises pores. With "pores" are meant the empty spaces that are comprised in the solid foam. These empty spaces, or pores are located in between the solid continuous phase. The term "pores", according to the invention, can also be referred to as "cells".

With «empty spaces», is meant that the pores are devoid of the material of which is composed the solid continues phase, i.e. a cross-linked organic polymer. The pores might however contain another medium, such as a gas, in particular air. The contents of the pores can in particular be a gas phase that was used to prepare the foam, such as air.

Structurally, the solid continuous phase is comprised of plateau borders and nodes, which make up the skeletal system of the solid continues phase. The term "plateau borders" refers to the meeting point of three pores. In other words, a plateau border refers to an edge, or ridge, separating three pores, at an angle of arccos(−½) of 120°.

Four plateau borders form a junction referred to as "node". The pores can optionally be separated from each other by a thin layer of solid phase, referred to as a "film".

The film thickness can be controlled during the production process of the foam, for instance by changing the polymer concentration in solution. Higher concentrations lead to thicker films.

FIG. 1 is a schematic representation of a typical three-dimensional polymeric foam, in which the different structural features of the solid continuous phase are indicated (Modified from Weaire, D, Hutzler, S., *The physics of foams*, Oxford University Press, 1999). The solid continuous phase that is comprised of the plateau borders B and the nodes C, and the film A. These solid structural features separate the pores. These structural features of the foam can be analyzed using techniques such as atomic force microscopy or light scattering microscopy.

According to the present invention, a three-dimensional foam comprises more than 1 pore in every direction, in contrast to a two-dimensional foam, which is essentially a monolayer of pores spreading in 2 space directions.

Figure 2:
FIG. 2 represents examples of diameters as measured for different pore shapes, shown by a dashed line.

The "pore size" according to the invention is defined as the diameter of the pores as measured optically by confocal microscopy in transmission. The diameter is considered starting from a node and tracing a line through the center of the pore to the opposite side of the pore, as indicated by the dashed line in FIG. 2 for different pore shapes.

The pore size is determined as the arithmetic average of the pore sizes as measured for a minimum of 50 pores.

With "50 nm to 200 µm" relating to the pore size, should also be understood the following ranges: 50 to 100 nm, 50 to 250 nm, 50 to 500 nm, 50 nm to 1 µm, 50 nm to 2 µm, 50 nm to 5 µm, 50 nm to 10 µm, 50 nm to 25 µm, 50 nm to 50 µm, 50 nm to 80 µm, 50 nm to 100 µm, 50 nm to 150 µm, 50 nm to 180 µm, 100 nm to 200 µm, 250 nm to 200 µm, 500 nm to 200 µm, 1 to 200 µm, 2 to 200 µm, 5 to 200 km, 10 to 200 µm, 25 to 200 µm, 50 to 200 µm, 100 to 250 µm, 150 to 250 µm, 75 nm to 175 µm, 100 nm to 150 µm, 250 nm to 125 µm, 500 nm to 100 µm, 1 µm to 75 µm, 5 µm to 50 µm, 10 µm to 25 µm.

The expression "volumetric fraction of the solid phase" denotes the volume occupied by the solid continuous phase with respect to the total volume of the three-dimensional polymeric structure:

$$\text{Volumetric fraction of the solid phase} = \frac{\text{volume of the solid continuous phase}}{\text{total volume of the foam}} \quad \text{Formula 1}$$

wherein the total volume of the foam corresponds to the sum of the volume occupied by the solid continuous phase and the total volume of the pores.

Volume fractions can be calculated, as an example, using Formula 2 (Forel et. al., *Soft Matter*, 2016, p. 1-8):

$$1 - \Phi s = \left(1 - \sqrt{\frac{\Phi}{\Phi c}}\right)^2 \quad \text{Formula 2}$$

Wherein:
$\phi_s$ is the surface fraction
$\phi$ is the volume fraction of the solid continuous phase
$\phi_c$ is the critical volume fraction.

The surface fraction in turn can be determined using classical methods such as optical microscopy combined with an image treatment using software such as imageJ or Matlab.

With "0.1 to 60%" relating to the volumetric fraction of the solid phase, should also be understood the following ranges: 0.1 to 50%, 0.1 to 40%, 0.1 to 30%, 0.1 to 20%, 0.1 to 10%, 0.1 to 5%, 5 to 60%, 10 to 60%, 20 to 60%, 30 to 60%, 40 to 60%, 50 to 60%, 5 to 50%, 10 to 30%, 15 to 20%, in particular 0.1 to less than 10%.

With "flexibility/elasticity" is meant, according to the present invention, the pressure needed to be applied to the foam in order to achieve deformation of said foam. According to the present invention, this value corresponds to the elastic modulus, equal to the ratio of applied shear stress to strain of the foam, measured using a rheometer.

With "10 to $10^7$" should also be understood the following ranges: $10^2$ to $10^7$, $10^3$ to $10^7$, $10^4$ to $10^7$, $10^5$ to $10^7$, $10^6$ to $10^7$, 10 to $10^6$, 10 to $10^5$, 10 to $10^4$, 10 to $10^3$, 10 to $10^2$, $10^2$ to $10^6$, $10^3$ to $10^5$.

The access to a material with a large range of elasticities, such as the ones observed for the foams of the present invention, is crucial in, for instance, 3D cell culture for tissue engineering. Adjusting the scaffold pore size to the cell size and the scaffold elasticity to the human tissue allows to mimic the natural environment of the different types of human cells.

The "polydispersity index", or PDI, represents a measure of the size distribution of the pores. The polydispersity index according to the present invention is calculated according to Formula 3.

$$PDI = \frac{100\sqrt{\langle d^2 \rangle - \langle d \rangle^2}}{\langle d \rangle} \quad \text{Formula 3}$$

in which
d represents the diameter of the individual pores as measured by confocal microscopy.
<d> represents the average of the measured diameter for a population of pores.

With "1 to 30%" relating to the polydispersity index, should also be understood the following ranges: 1 to 1.5%, 1 to 2%, 1 to 2.5%, 1 to 3%, 1 to 4%, 1 to 5%, 1 to 7.5%, 1 to 10%, 1 to 15%, 1 to 20%, 1 to 25%, 2 to 30%, 5 to 30%, 10 to 30%, 15 to 30%, 20 to 30%, 25 to 30%, 5 to 25%, 7.5 to 20%, or 10 to 15%.

The expression "ordered foam", refers to foam structure which possesses a translational symmetry, i.e. where from the position of one pore (in the case of a monodisperse foam) or one elementary repetitive unit (group of pores), all the positions of the other pores (or groups of pores) can be derived, by translations along specific vectors. Quantitatively, the order is classically quantified by using the correlation function, for example of the intensity field imaging the solid phase (Sethna et. al., *Entropy, order parameter and complexity*, Oxford master series in theoretical physics, 2006). An ordered foam is a foam for which such a correlation function remains high (for example >80%) over large distances of separation (for instance the largest distance embedded in a 100 pores volume)

In a preferred embodiment of the present invention, the pore size is comprised from 50 nm to 50 µm.

In a preferred embodiment of the present Invention, the polydispersity index is comprised from 1 to 5%, said foam being monodisperse.

In another embodiment of the present invention, the polydispersity index is comprised from more than 5% to 30%, said foam being substantially monodisperse.

According to the present invention, monodispersity is defined by a polydispersity index equal or inferior to 5% as calculated by Formula 3 as previously described. A foam having a polydispersity index comprised from more than 5% to 30% is considered substantially monodisperse, whereas a foam having a polydispersity index higher than 30% is considered polydisperse.

Monodisperse, or substantially monodisperse foams are thus characterized by a narrow distribution of pore size, as quantified by the polydispersity index.

In a preferred embodiment, the present invention relates to an organic solid three-dimensional polymeric foam as previously defined, wherein said foam is ordered over a volume of 100 to 1000 pores, in particular 1000 pores.

With "100 to 1000" should also be understood the following ranges: 200 to 1000, 300 to 1000, 400 to 1000, 500 to 1000, 600 to 1000, 700 to 1000, 800 to 1000, 900 to 1000.

The present invention also concerns an organic solid three-dimensional polymeric foam consisting of, or comprising a solid continuous phase and pores,
wherein said solid continues phase is a cross-linked organic polymer,
wherein said pores are separated by plateau borders, the meeting points of said plateau borders forming nodes,
wherein said foam has:
- A pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a flexibility/elasticity comprised from 10 to $10^7$ Pa,
- a polydispersity index comprised from 1 to 30%, wherein said solid three-dimensional polymeric foam is ordered over a volume of at least 100 pores, in particular over a volume of 100 to 1000 pores, in particular 1000 pores.

In yet another embodiment, the present invention relates to an organic solid three-dimensional polymeric foam as previously defined, wherein said foam presents a thermal degradation at temperatures comprised from 100 to 250° C., preferably about 150° C.

With "100 to 250° C." should also be understood the following ranges: 100 to 225° C., 100 to 200° C., 100 to 175° C., 100 to 150° C., 100 to 125° C., 125 to 250° C., 150 to 250° C., 175 to 250° C., 200 to 250° C., 225 to 250° C., 125 to 225° C., 150 to 200° C.

Foams according to the present invention are stable for at least 1 year at room temperature in an environment exposed to air.

Indeed, the structural properties of the cross-linked foam do not change in a surrounded air environment for at least 1 year at room temperature, i.e. 20-25° C. The cross-linked foam is resistant to the presence of solvents such as water, ethanol and the several cell culture media (for example the type RPMI-1640, pH~7.37° C.) for at least one week.

The cross-linked foam is resistant in environments whose pH varies between 3 and 10 for at least 2 days.

However, at higher temperatures (100 to 250° C.), molecular deterioration occurs, and the foam loses its initial physical and mechanical properties.

The degradation temperature depends on the polymer used. In the case of a chitosan foam, this temperature is around 150° C.

In yet another embodiment, the present invention relates to an organic solid three-dimensional polymeric foam as previously defined, wherein the organic polymer is chosen from the groups of:
- biopolymers, in particular polysaccharides, in particular polysaccharides of natural origin, said polysaccharides being in particular chosen from chitosan, hyaluronic acid, alginate, starch, dextrin, glycogen, dextran, gellan, pullulan, cellulose, hemicellulose, pectin, curdlan, agar-agar, alginate, carrageenan, chitosan, hyaluronic acid, xanthan, zooglan and succinoglycan,
- polyvinyl alcohols polylactic acids (PLA), Poly-L-Lactic acids (PLLA), poly(lactic-co-glycolic acids) (PLGA), polyethylene glycols (PEG),
- polyacrylates (PA), polymethacrylates (PMA), Poly(methyl methacrylates) (PMMA), polystyrenes (PS), poly-N-vinylpyrrolidones (PVP), Polyethyleneglycol acrylates (PEGA), polyethyleneglycol methacrylates (PEGMA), polyethyleneglycol diacrylates (PEGMA), polyethyleneglycol dimethacrylates (PEGDMA), or mixtures of said organic polymers,
said organic polymer being cross-linked with a cross-linker chosen from the group of:
- glycerol-phosphate disodium salt, glyoxal, genipin, sodium tripolyphosphate (TPP), divinyl sulfone (DVS), calcium chloride ($CaCl_2$)), calcium acetate, glutaraldehyde, polyaldehydes and butanediol glycidyl ether, or mixtures of said cross-linking agents.

A specific polymer being advantageously cross-linked with an appropriate cross-linker defined above. For example, chitosan can be cross-linked with glyoxal, alginate can be cross-linked with calcium chloride, and polyvinyl alcohols can be cross-linked with glutaraldehyde.

In a preferred embodiment, the present invention relates to an organic solid three-dimensional polymeric foam as previously defined, wherein the organic polymer is chitosan, said organic polymer being cross-linked with glyoxal.

In yet another embodiment, the present invention relates to an organic solid three-dimensional polymeric foam as previously defined, wherein the organic polymer is chosen from the groups of:
- biopolymers, in particular polysaccharides, in particular polysaccharides of natural origin, said polysaccharides being in particular chosen from chitosan, hyaluronic acid, alginate, starch, dextrin, glycogen, dextran, gellan, pullulan, cellulose, hemicellulose, pectin, curdlan, agar-agar, alginate, carrageenan, chitosan, hyaluronic acid, xanthan, zooglan and succinoglycan,
- polyvinyl alcohols polylactic acids (PLA), Poly-L-Lactic acids (PLLA), poly(lactic-co-glycolic acids) (PLGA), polyethylene glycols (PEG),
- polyacrylates (PA), polymethacrylates (PMA), Poly(methyl methacrylates) (PMMA), polystyrenes (PS), poly-N-vinylpyrrolidones (PVP), Polyethyleneglycol acrylates (PEGA), polyethyleneglycol methacrylates (PEGMA), polyethyleneglycol diacrylates (PEGDA), polyethyleneglycol dimethacrylates (PEGDMA), or mixtures of said organic polymers,
said organic polymer being cross-linked with a cross-linker chosen from the group of:
- glycerol-phosphate disodium salt, glyoxal, genipin, sodium tripolyphosphate (TPP), divinyl sulfone (DVS), calcium chloride ($CaCl_2$), calcium acetate, glutaraldehyde, polyaldehydes and butanediol glycidyl ether, or mixtures of said cross-linking agents,
said organic polymer being in particular chitosan, cross-linked with glyoxal.

In yet another embodiment, the present invention relates to an organic solid three-dimensional polymeric foam as previously defined, wherein the pores are comprised of from 1 to 10 population(s) of pores, in particular from 2 to 10 populations of pores, or 1 or 2 population(s) of pores, each population of pores having a specific pore size and/or a specific polydispersity index, said pore size and polydispersity index being as previously defined.

With "population of pores" is meant, according to the present invention, a set of pores having substantially the same pore sizes and substantially the same polydispersity index. For instance, in the case of a foam having 2 populations of pores, the first population has a different pore size and/or a different polydispersity index than the second population of pores.

With a different pore size is meant a relative difference in average pore size of at least 10%, in particular 20%, said pore size corresponding to the average pore size as previously defined. For instance, a population of pores having an average pore-size of 100 µm would be considered different from a second population when the second population has an average pore size of at least 100+100*0.1 (10%)=110 µm.

With a different polydispersity index is meant an absolute difference in polydispersity index of at least 1%. For instance, a population of pores having a polydispersity index of 5% would be considered different from a second population when the second population has a polydispersity index of at least 6%.

When defining the pore size or the polydispersity index of a foam according to the present invention, each population of pores is analyzed independently.

Thus, a pore size comprised from 50 nm to 200 µm, and a polydispersity index comprised from 1 to 30%, as defined above, refers to the values for one set of pores, and not the average of multiple sets of pores. A foam having 2 populations of pores is thus characterized by 2 pore size values of and 2 corresponding polydispersity indexes.

In yet another embodiment, the present invention relates to an organic solid three-dimensional polymeric foam as previously defined, wherein the 2 to 10 populations of pores, in particular 2 populations of pores, have both different pore sizes and different polydispersity indexes.

In yet another embodiment, the present invention relates to an organic solid three-dimensional polymeric foam as previously defined, wherein the 2 to 10 populations of pores, in particular 2 populations of pores, have different pore sizes, but substantially the same polydispersity index.

In a preferred embodiment, the present invention relates to an organic solid three-dimensional polymeric foam as previously defined, wherein the organic solid three-dimensional polymeric foam has an alveolar structure,
  wherein the pores have a substantially polyhedral or hexagonal shape, wherein the angle of the polyhedral or hexagonal shapes varies from 100° to 120°.

According to the present invention, the expression "alveolar structure" indicates a repetitive system comprising alveoli. In a three-dimensional alveolar structure, the "plateau borders", being the meeting point of three alveoli, meet with an angle comprised from 100° to 120°. Said angle is generally 109.5°.

In a preferred embodiment, the present invention relates to an organic solid three-dimensional polymeric foam as previously defined, wherein the pores have a substantially spherical shape.

In yet another embodiment, the present invention relates to an organic solid three-dimensional polymeric foam as previously defined, wherein the organic solid three-dimensional polymeric foam has an open pore structure, or a partially open pore structure,
  said partially open pore structure comprising both open and closed pores.

With the expression "partially open pore structure" is meant, according to the present invention, that less than 100%, but more than 0% of the pores are open pores, devoid of the film separating the pores, compared to the sum of open and closed pores. In particular from 1 to 99% of the total amount of pores are open, more in particular from 5 to 95%, or from 10 to 90%, or from 20 to 80%, or from 30 to 70%, or from 40 to 60%, the remaining pores being closed pores, having an intact film.

In the case of an "open pore structure" the films separating the pores, as previously defined, are completely or partially burst, and the pores are connected to each other, but the plateau borders and the nodes are still present.

In case the pores are separated by an intact film, the resulting foam is referred to as an "closed pore foam". The pores are isolated from each other and are surrounded by complete, intact cell wall structures.

In yet another embodiment, the present invention relates to an organic solid three-dimensional polymeric foam as previously defined, wherein the organic solid three-dimensional polymeric foam has a closed pore structure.

In yet another embodiment, the present invention relates to an organic solid three-dimensional polymeric foam as previously defined, wherein the organic solid three-dimensional polymeric foam has an open pore structure, or a partially open pore structure, said partially open pore structure comprising both open and closed pores, or wherein the organic solid three-dimensional polymeric foam has a closed pore structure.

In yet another embodiment, the present invention relates to an organic solid three-dimensional polymeric foam as previously defined, wherein the solid continuous phase has a volumetric fraction:
  comprised from 5 to 7% compared to the total volume of the foam, said foam having a crystalline body cubic centered (BCC) structure, or
  comprised from more than 7 and 10% compared to the total volume of the foam, said foam having both a crystalline body cubic centered (BCC) structure and a crystalline face cubic centered (FCC) structure, or
  comprised from more than 10 to 25% compared to the total volume of the foam, said foam having a crystalline face cubic centered (FCC) structure,
said solid three-dimensional polymeric foam being ordered.

In this embodiment, the pores are highly organized into a crystalline structure, the unit cells of which are cubic.

Figure 3:
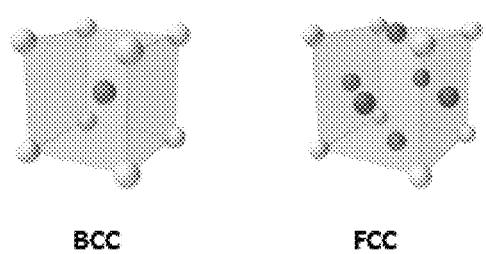
FIG. 3 represents the configuration of the unit cells in a crystal lattice, in a crystalline body cubic centered (BCC) structure (left), or a crystalline face cubic centered (FCC) structure (right).

The crystalline structures according to the present invention can have a crystalline body cubic centered (BCC) structure, a crystalline face cubic centered structure (FFC), or mixtures thereof. FIG. 3 illustrates the configuration of the unit cells corresponding to these structures. These structures are discussed in detail in the publication by Drenckhan et. al., "*structure and energy of liquid foams*", advances in colloid and interface science, 2015, p. 1-16.

A BCC crystalline structure is an arrangement of pores in crystals in which the pore's centers are disposed in space in such a way that one pore is located at each of the corners of the unit cell. Each unit cell thus comprises a total of 2 pores (1+8*⅛).

A FCC crystalline structure, is an arrangement of pores in crystals in which the pore's centers are disposed in space in such a way that one pore is located at each of the corners of the unit cell and one at the center of each face. Each unit cell thus comprises 4 pores (8*⅛+6*½).

In yet another embodiment, the present invention relates to an organic solid three-dimensional polymeric foam as previously defined, wherein the foam has a Weaire-Phelan structure said foam having a volumetric fraction of the solid continuous phase comprised from 5 to 7% compared to the total volume of the foam.

In addition to the 2 crystalline structures, FCC and BCC, previously defined, crystalline foams according to the present invention can have a Weaire-Phelan structure.

Figure 4:
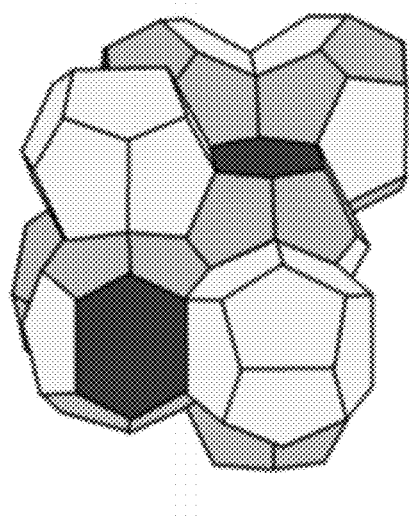
FIG. 4 represents the 3D geometry of a Weaire-Phelan foam.

A Weaire-Phelan foam has a complex 3D geometry containing two types of polyhedral pore shapes in the unit cell; the first is a pyritohedron, which is an irregular dodecahedron with pentagonal faces, and the second is a form of truncated hexagonal trapezohedron, a species of tetrakaidecahedron with two hexagonal and twelve pentagonal faces (Gabbrielli R., *A new counter-example to Kelvin's conjecture on minimal surfaces, Philos. Mag. Lett.*, 2009, 89(8), p. 483-91). The Weaire-Phelan structure is conjectured to be the structure of the lowest surface area for foams having a fraction of the continuous phase smaller than 7%, called dry foams, with equal-volume bubbles, or pores (FIG. 4).

In yet another embodiment, the present invention relates to an organic solid three-dimensional polymeric foam as previously defined, wherein the solid continuous phase has:
- a crystalline body cubic centered (BCC) structure, said foam having a volumetric fraction of the solid continuous phase comprised from 5 to 7% compared to the total volume of the foam, or
- both a crystalline body cubic centered (BCC) structure and a crystalline face cubic centered (FCC) structure, said foam having a volumetric fraction of the solid continuous phase comprised from more than 7 and 10% compared to the total volume of the foam, or
- a crystalline face cubic centered (FCC) structure, said foam having a volumetric fraction of the solid continuous phase comprised from more than 10 to 25% compared to the total volume of the foam, or
- a crystalline Weaire-Phelan structure, said foam having a volumetric fraction of the solid continuous phase comprised from 5 to 7% compared to the total volume of the foam, said solid three-dimensional polymeric foam being ordered.

In yet another embodiment, the present invention relates to an organic solid three-dimensional polymeric foam as previously defined, wherein the organic solid three-dimensional polymeric foam has a volume at least of 1 mm$^3$, in particular comprised from 100 mm$^3$ to 30 cm$^3$, more in particular comprised from 1 to 3 cm$^3$.

In yet another embodiment, the present invention relates to an organic solid three-dimensional polymeric foam as previously defined, wherein the organic solid three-dimensional polymeric foam further comprises nanoparticles, said nanoparticles being in particular located within the three-dimensional structure of the solid foam, more in particular within the plateau borders and the nodes of the solid foam.

The invention is also related to an organic solid three-dimensional polymeric foam consisting of a solid continuous phase, pores, and nanoparticles,
wherein said solid continuous phase is a cross-linked polymer,
wherein said pores being separated by plateau borders, the meeting points of said plateau borders forming nodes,
wherein said foam has:
- a pore size comprised from 50 nm to 200 µm, in particular from 50 nm to less than 10 µm, or from 10 to 200 µm,
- a volumetric fraction of the solid continuous phase comprised from 0.1 to 60%, with respect to the total volume of the foam,
- a flexibility/elasticity comprised from 10 to 10$^7$ Pa,
- a polydispersity index comprised from 1 to 30%,
wherein said solid three-dimensional polymeric foam is ordered over a volume of at least 100 pores, in particular comprised from 100 to 1000 pores, in particular 1000 pores, wherein said nanoparticles are in particular located within the three-dimensional structure of the foam, more in particular within the plateau borders and the nodes of the solid foam.

In a preferred embodiment, the present invention relates to an organic solid three-dimensional polymeric foam as previously defined, wherein the nanoparticles are chosen from the group of:
- metal oxide nanoparticles, in particular titanium dioxide (TiO$_2$) or aluminum oxide (Al$_2$O$_3$),
- metallic nanoparticles, in particular silver (Ag), gold (Au), iron (Fe), nickel (Ni), copper (Cu) or germanium (Ge),
- bi-metallic nanoparticles, in particular gallium arsenide (GaAs), lead telluride (PbTe), or iron platinum (FePt),
- tri-metallic nanoparticles, in particular aluminum gallium arsenide (Al$_x$Ga$_{1-x}$As),
- ceramic nanoparticles, in particular silicon carbide (SIC) or tungsten carbide (WC),
- magnetic nanoparticles, in particular iron oxide (Fe$_2$O$_3$),
- silica (SiO$_2$) nanoparticles,
- polymeric nanoparticles,
or mixtures thereof.

In yet another embodiment, the present invention relates to an organic solid three-dimensional polymeric foam as previously defined, wherein said solid three-dimensional polymeric foam further comprises an active pharmaceutical ingredient, said active pharmaceutical ingredient being in particular located within the three-dimensional structure of the solid foam, more in particular within the plateau borders and the nodes of the solid foam.

The present invention also concerns an organic solid three-dimensional polymeric foam consisting of a solid continuous phase, pores, and an active pharmaceutical ingredient,
wherein said solid continuous phase is a cross-linked polymer,
wherein said pores being separated by plateau borders, the meeting points of said plateau borders forming nodes,
wherein said foam has:
- a pore size comprised from 50 nm to 200 µm, in particular from 50 nm to less than 10 µm, or from 10 to 200 µm,
- a volumetric fraction of the solid continuous phase comprised from 0.1 to 60%, with respect to the total volume of the foam,
- a flexibility/elasticity comprised from 10 to 10$^7$ Pa,
- a polydispersity index comprised from 1 to 30%,
wherein said solid three-dimensional polymeric foam is ordered over a volume of at least 100 pores, in particular comprised from 100 to 1000 pores, in particular 1000 pores, wherein said active pharmaceutical ingredient is in particular located within the three-dimensional structure of the foam, more in particular within the plateau borders and the nodes of the solid foam.

In a preferred embodiment, the present invention relates to an organic solid three-dimensional polymeric foam as previously defined, wherein the active pharmaceutical ingredient is chosen from the group comprising:
- anti-inflammatory drugs, in particular diclofenac, ibuprofen, acetyl salicylic acid, or steroid based anti-inflammatory drugs,
- anti-cancer drugs, in particular paclitaxel, docetaxel, or doxorubicin,
- analgesics, in particular morphine,
- antibiotics, in particular penicillin or sulfonamide antibiotics.

In yet another embodiment, the present invention relates to an organic solid three-dimensional polymeric foam as previously defined, wherein the active pharmaceutical ingredient comprises a radiotracer, in particular chosen from $^{14}C$, $^{51}Cr$, $^{18}F$, $^{67}Ga$ or $^{123}I$.

In yet another embodiment, the present invention relates to an organic solid three-dimensional polymeric foam as previously defined, wherein said solid three-dimensional polymeric foam further comprises a contrast agent, said contrast agent being in particular located within the three-dimensional structure of the solid foam, more in particular within the plateau borders and the nodes of the solid foam.

The present invention also concerns an organic solid three-dimensional polymeric foam consisting of a solid continuous phase, pores, and a contrast agent,
wherein said solid continuous phase is a cross-linked polymer,
wherein said pores being separated by plateau borders, the meeting points of said plateau borders forming nodes,
wherein said foam has:
- a pore size comprised from 50 nm to 200 µm, in particular from 50 nm to less than 10 µm, or from 10 to 200 µm,
- a volumetric fraction of the solid continuous phase comprised from 0.1 to 60%, with respect to the total volume of the foam,
- a flexibility/elasticity comprised from 10 to $10^7$ Pa,
- a polydispersity index comprised from 1 to 30%,
wherein said solid three-dimensional polymeric foam is ordered over a volume of at least 100 pores, in particular comprised from 100 to 1000 pores, in particular 1000 pores, wherein said contrast agent is in particular located within the three-dimensional structure of the foam, more in particular within the plateau borders and the nodes of the solid foam.

In a preferred embodiment, the present invention relates to an organic solid three-dimensional polymeric foam as previously defined, wherein the contrast agent is ipodate sodium.

In yet another embodiment, the present invention relates to an organic solid three-dimensional polymeric foam as previously defined, wherein said solid three-dimensional polymeric foam further comprises a dye, said dye being in particular located within the three-dimensional structure of the solid foam, more in particular within the plateau borders and the nodes of the solid foam.

The present invention also concerns an organic solid three-dimensional polymeric foam consisting of a solid continuous phase, pores, and a dye,
wherein said solid continuous phase is a cross-linked polymer,
wherein said pores being separated by plateau borders, the meeting points of said plateau borders forming nodes,
wherein said foam has:
- a pore size comprised from 50 nm to 200 µm, particular from 50 nm to less than 10 µm, or from 10 to 200 µm,
- a volumetric fraction of the solid continuous phase comprised from 0.1 to 60%, with respect to the total volume of the foam,
- a polydispersity index comprised from 1 to 30%, said foam being substantially monodisperse,
wherein said solid three-dimensional polymeric foam is ordered over a volume of at least 100 pores, in particular comprised from 100 to 1000 pores, in particular 1000 pores, wherein said dye is in particular located within the three-dimensional structure of the foam, more in particular within the plateau borders and the nodes of the solid foam.

In a preferred embodiment, the present invention relates to an organic solid three-dimensional polymeric foam as previously defined, wherein the dye is an organic dye, in particular a water-soluble organic dye, pigments, or quantum dots,
said organic dye being in particular chosen from the group comprising:
Fluorescein, Eosin, Amaranth, Sanolin Blue NBL, Anthocyanins, methylene blue, indocyanine green (ICG), Rhodamine B, Cyanine, Evans Blue, Primulin, Isamine Blue, and Naphtol green B.

In yet another embodiment, the present invention relates to an organic solid three-dimensional polymeric foam, further comprising nanoparticles, an active pharmaceutical ingredient, a contrast agent, or a dye, as previously defined, wherein the organic solid three-dimensional polymeric foam, and wherein the pore size is comprised from 50 nm to 100 µm, in particular from 50 nm to 50 µm, more in particular from 50 nm to 10 prn.

According to the present invention, the nanoparticles, the active pharmaceutical ingredient, the contrast agent, or the dye, are in particular located within the solid continuous phase of the foam.

Said nanoparticles, active pharmaceutical ingredient, contrast agent, or dye are less prone to detach themselves from the foam, for example by diffusion into the external environment (leaching). This characteristic renders the foams particularly interesting for applications under conditions where leaching is unwanted, such as photonics or biomedical applications.

The nanoparticles, the active pharmaceutical ingredient, the contrast agent, or the dye can be released, if necessary, by solubilization of the foam, rendering the foam useful for, for example, controlled delivery applications.

In yet another embodiment, the present invention relates to an organic solid three-dimensional polymeric foam as previously defined, wherein the organic solid three-dimensional polymeric foam further comprises:
nanoparticles, in particular chosen from the group of:
  metal oxide nanoparticles, in particular titanium dioxide ($TiO_2$) or aluminum oxide ($Al_2O_3$),
  metallic nanoparticles, in particular silver (Ag), gold (Au), iron (Fe), nickel (Ni), copper (Cu) or germanium (Ge),
  bi-metallic nanoparticles, in particular gallium arsenide (GaAs), lead telluride (PbTe), or iron platinum (FePt),
  tri-metallic nanoparticles, in particular aluminum gallium arsenide ($Al_xGa_{1-x}As$),
  ceramic nanoparticles, in particular silicon carbide (SiC) or tungsten carbide (WC),
  magnetic nanoparticles, in particular iron oxide ($Fe_2O_3$),
  silica ($SiO_2$) nanoparticles,
  polymeric nanoparticles,
or mixtures thereof,
or
an active pharmaceutical ingredient, in particular chosen from the group of:
  anti-inflammatory drugs, in particular diclofenac, ibuprofen, acetyl salicylic acid, or steroid based anti-inflammatory drugs,
  anti-cancer drugs, in particular paclitaxel, docetaxel, or doxorubicin,
  analgesics, in particular morphine,
  antibiotics, in particular penicillin or sulfonamide antibiotics, said active pharmaceutical ingredient optionally comprising a radiotracer, in particular chosen from $^{14}$C, $^{51}$Cr, $^{18}$F, $^{67}$Ga or $^{123}$I, or a contrast agent, in particular ipodate sodium, or a dye, in particular an organic dye, more in particular a water-soluble organic dye, pigments, or quantum dots, said organic dye being in particular chosen from the group comprising:

Fluorescein, Eosin, Amaranth, Sanolin Blue NBL, Anthocyanins, methylene blue, indocyanine green (ICG), Rhodamine B, Cyanine, Evans Blue, Primulin, Isamine Blue, and Naphtol green B, said nanoparticles, active pharmaceutical ingredient, contrast agent or dye being optionally coupled to a fluorophore, in particular chosen from Fluorescein or Rhodamine B, said nanoparticles, active pharmaceutical ingredient, contrast agent or dye being in particular located within the three-dimensional structure of the solid foam, more in particular within the plateau borders and the nodes of the solid foam.

In yet another embodiment, the present invention relates to an organic solid three-dimensional polymeric foam as previously defined, wherein the nanoparticle, the active pharmaceutical ingredient, the contrast agent, or the dye is coupled to a fluorophore, the fluorophore being in particular chosen from fluorescein or rhodamine B.

In yet another embodiment, the present invention relates to an organic solid three-dimensional polymeric foam as previously defined, wherein the nanoparticles further comprise an active pharmaceutical ingredient, a contrast agent, or a dye, said nanoparticles, active pharmaceutical ingredient, or contrast agent, being as previously defined.

The present invention also concerns an organic solid three-dimensional polymeric foam consisting of, or comprising a solid continuous phase and pores, wherein said solid continues phase is a cross-linked organic polymer, wherein said pores are separated by plateau borders, the meeting points of said plateau borders forming nodes, wherein said foam has:

a pore size comprised from 50 nm to 200 µm, in particular from 50 nm to less than 10 µm, or from 10 to 200 µm, a volumetric fraction of the solid continuous phase comprised from 0.1 to 60%, with respect to the total volume of the foam, a flexibility/elasticity comprised from 10 to $10^7$ Pa, a polydispersity index comprised from 1 to 30%, a volume higher than 1 cm$^3$, in particular comprised between 1 and 30 cm$^3$, more in particular comprised between 1 and 3 cm$^3$, wherein said solid three-dimensional polymeric foam is ordered over a volume of at least 100 pores, in particular comprised from 100 to 1000 pores, in particular 1000 pores.

The present invention also concerns a process of preparation of an organic solid three-dimensional polymeric foam consisting of, or comprising a solid continuous phase and pores, wherein said solid continues phase is a cross-linked organic polymer, wherein said pores are separated by plateau borders, the meeting points of said plateau borders forming nodes, said solid three-dimensional polymeric foam:

a pore size comprised from 50 nm to 200 µm, in particular from 50 nm to less than 10 µm, or from 10 to 200 µm, a volumetric fraction of the solid continuous phase comprised from 0.1 to 60%, with respect to the total volume of the foam, a polydispersity index comprised from 1 to 30%, said process comprising:

a step A of microfluidic bubbling of a gas phase through a liquid phase comprising a cross-linkable organic polymer, a cross-linking agent, a solvent and optionally a stabilizing agent, to obtain an organic liquid three-dimensional polymeric foam comprising a liquid continuous phase and bubbles, and a step B of cross-linking of said liquid three-dimensional polymeric foam comprising a liquid continuous phase and bubbles, to obtain an organic solid three-dimensional polymeric foam comprising a solid continuous phase and pores, said solid continuous phase being derived from the liquid phase, and said pores being derived from the bubbles, said step A of microfluidic bubbling being carried out at a temperature low enough to inhibit the cross-linking reaction, in particular at a temperature lower than 15° C., in particular comprised from 5 to 10° C., said step B of cross-linking being carried out after the step A of microfluidic bubbling and at a temperature high enough to trigger the cross-linking reaction, in particular at a temperature higher than 20° C., in particular comprised from 30 to 100° C., said step A of microfluidic bubbling and said step B of cross-linking being carried out in separate reactors, step A being carried out in reactor A and step B being carried out in reactor B.

The expression "organic liquid three-dimensional polymeric foam" refers to a foam wherein the continuous phase is liquid. As for the previously defined organic solid three-dimensional polymeric foam, the liquid foam comprises an organic polymer, and the continuous phase is comprised of plateau borders, films, and nodes. The pores in a liquid foam are referred to as "bubbles". Liquid foams are the result of step A of microfluidic bubbling and are thus intermediates in the preparation of the solid foams.

Reactor A consists of, or comprises a device compatible with microfluid technology, i.e. a microfluidic device, whereas reactor B, can be any reactor classically used in chemistry laboratories. Reactor A can consist of multiple microfluidic devices, in particular 2 microfluidic devices.

Polymer liquid foam can in itself be sufficiently stable to persist throughout the production process, from its formation up until the formation of the solid foam during the cross-linking step. A stabilizing agent can however be added to further increase the stability of the liquid foam. With "stabilizing agent" is thus meant an agent that increases the stability of the liquid foam.

Step A of microfluidic bubbling step is performed at a temperature where cross-linking does not take place, and the polymeric foam stays in liquid form until the foam is subjected to the cross-linking reaction of step B, which is performed at a temperature at which the cross-linking reaction takes place. For instance, the cross-linking of a chitosan liquid polymer with glyoxal takes place at a temperature of around 40° C. Thus, by keeping reactor A at a temperature lower than 15° C., cross-linking is avoided. Subsequent heating to 70° C. will initiate the cross-linking reaction.

Figure 5:
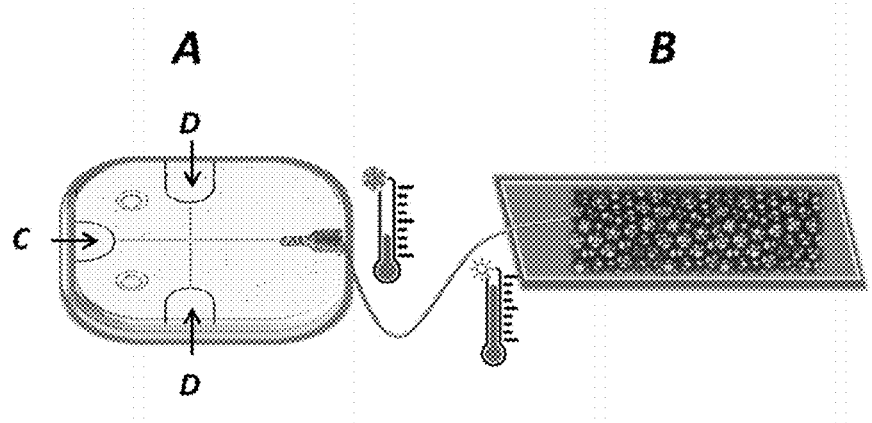
FIG. 5 represents an experimental set-up that can be used in the process according to the present invention. A represents reactor A, B represents reactor B, C represents the entry of the gas phase, D represents the entry of the liquid phase.
Figure 6:
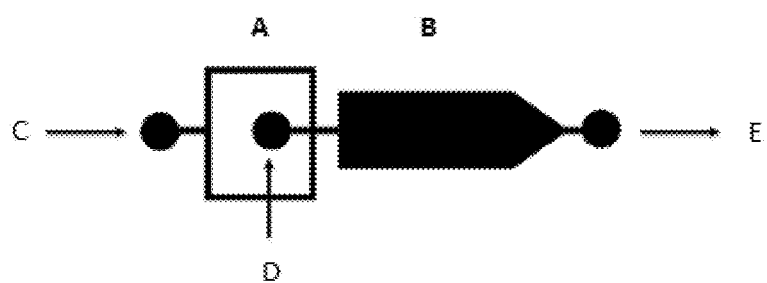
FIG. 6 represents a simplified schematic representation of the experimental setup of FIG. 5. A represents reactor A, B represents reactor B, C represents the entry of the gas phase, D represents the entry of the liquid phase, E represents the foam outlet.

FIGS. 5 and 6 schematically represent a possible reaction setup for the process of the present invention. A represents reactor A (left). Said reactor comprises and entry for the gas phase (C), and an entry for the liquid phase (D). Reactor A is kept below 15° C. in order to inhibit the cross-linking reaction. The liquid foam is then transferred to reactor B (right). This reactor is warmer than reactor A, i.e. a temperature higher than 20° C., thus initiating the cross-linking reaction. After formation of the solid foam, said foam can be extruded through foam outlet E.

With "a temperature lower than 15° C." is meant a temperature low enough to inhibit the cross-linking, but high enough so as not to freeze the reaction mixture. In particular comprised from 0 to lower than 15° C., 0 to 10 T, 0 to 5° C., 5 to lower than 15° C., 10 to lower than 15° C., more in particular 5 to 10° C.

With "a temperature higher than 20° C." is meant a temperature high enough to initiate the cross-linking, but low enough to prevent boiling of the liquid phase. In particular comprised from more than 20° C. to 100° C., 40 to 100° C., 60 to 100° C., 80 to 100° C., more than 20° C. to 80° C., more than 20° C. to 60° C., more in particular comprised from 30 to 100° C.

The inventors have found that the above described process can be used to control the different stages of formation of organic solid three-dimensional polymeric foams, without unwanted side-reactions such as early cross-linking. Clogging of the microfluidic device could thus be prevented, allowing for the preparation of solid foams having small pore sizes, in particular smaller than 200 μm, not accessible using known processes.

The inventors further found that the process allows for controlled pore size formation with control over the polydispersity index and the flexibility/elasticity of the resulting ordered foam.

In yet another embodiment, the present invention relates to a process as previously defined, wherein the step A of microfluidic bubbling is preceded by the preparation of a gas phase, and by the preparation of a liquid phase comprising a cross-linkable organic polymer, a cross-linking agent, a solvent, and optionally a stabilizing agent.

In yet another embodiment, the present invention relates to a process as previously defined, wherein the step B of cross-linking is preceded by a step of transfer of the liquid polymeric foam from reactor A, to reactor B, said step of transfer being in particular a pressure driven transfer.

With "pressure driven transfer" is meant that the liquid foam is pushed out of reactor A by the fact that the liquid phase and the gas phase are introduced in reactor A using a pressure pump. This is a continuous process, wherein the liquid foam is continuously transferred from reactor A to reactor B, leading to gradual accumulation of the liquid foam in reactor B.

In a preferred embodiment, the present invention relates to a process as previously defined, wherein said step A of microfluidic bubbling is carried out during a time comprised from 30 nanoseconds to 10 minutes.

In a preferred embodiment, the present invention relates to a process as previously defined, wherein said step B of cross-linking is carried out during a time comprised from 10 seconds to 10 minutes.

A minimum time is necessary to ensure complete transformation of the liquid foam into solid foam during step B of cross-linking. Since, the cross-linking step occurs at elevated temperatures, i.e. higher than 20° C., heating for a too long period could lead to degradation of the solid foam.

In a preferred embodiment, the present invention relates to a process as previously defined, wherein said step A of microfluidic bubbling is carried out with a frequency of emission of bubbles is comprised from 0.1 Hz to 100 MHz.

The frequency of emission of bubbles reflects the number of bubbles that are bubbled through the liquid phase per second. A frequency of emission of bubbles inferior to 0.1 Hz would lead to a process that is not industrially applicable, because the production of sufficient amount of foam for use in an application would be time-consuming.

In a preferred embodiment, the present invention relates to a process as previously defined, wherein the volumetric ratio of the gas phase compared to the sum of the liquid phase and the gas phase during step A of microfluidic bubbling is comprised from 40 to 99.99%, in particular from 80 to 90%.

It should be noted that the step of cross-linking can lead to a change in the polydispersity index, and the bubble/pore sizes, indeed, shrinkage of the bubbles can be observed.

In addition, drying the solid foam, in particular using freeze-drying can also lead to a change in the polydispersity index, and the pore sizes.

The present invention also concerns a process of preparation of an organic solid three-dimensional polymeric foam consisting of, or comprising a solid continuous phase and pores,
wherein said solid continues phase is a cross-linked organic polymer,
wherein said pores are separated by plateau borders, the meeting points of said plateau borders forming nodes,
said solid three-dimensional polymeric foam:
  a pore size comprised from 50 nm to 200 μm, in particular from 50 nm to less than 10 μm, or from 10 to 200 μm,
  a volumetric fraction of the solid continuous phase comprised from 0.1 to 60%, with respect to the total volume of the foam,
  a polydispersity index comprised from 1 to 30%,
said process comprising:
  a step A of microfluidic bubbling of a gas phase through a liquid phase comprising a cross-linkable organic polymer, a cross-linking agent, a solvent and optionally a stabilizing agent,
to obtain an organic liquid three-dimensional polymeric foam comprising a liquid continuous phase and bubbles, and
  a step B of cross-linking of said liquid three-dimensional polymeric foam comprising a liquid continuous phase and bubbles,
to obtain an organic solid three-dimensional polymeric foam comprising a solid continuous phase and pores,
said solid continuous phase being derived from the liquid phase, and said pores being derived from the bubbles,
said step A of microfluidic bubbling being carried out at a temperature low enough to inhibit the cross-linking reaction, in particular at a temperature lower than 15° C., in particular comprised from 5 to 10° C.,
said step B of cross-linking being carried out after the step A of microfluidic bubbling and at a temperature high enough to trigger the cross-linking reaction, in particular at a temperature higher than 20° C., in particular comprised from 30 to 100° C.,
wherein the volumetric ratio of the gas phase compared to the sum of the liquid phase and the gas phase during step A of microfluidic bubbling is in particular comprised from 40 to 99.99%, in particular from 80 to 90%,
said step A of microfluidic bubbling and said step B of cross-linking being carried out in separate reactors,
step A being carried out in reactor A and step B being carried out in reactor B.

In a preferred embodiment, the present invention relates to a process as previously defined, wherein the volumetric ratio of the liquid phase compared to the sum of the liquid phase and the gas phase during step A of microfluidic bubbling is comprised from 0.001 to 60%, in particular from 10 to 20%.

In yet another embodiment, the present invention relates to a process as previously defined, wherein the size of the bubbles used during said step A of microfluidic bubbling is controlled by the flow rates, or by the pressures of the gas and the liquid phases, by the formulation and by the characteristic dimension of reactor A, said size of the bubbles being preferably comprised from 50 nm to 200 µm, in particular from 50 nm to less than 10 µm, said flow rates of the gas and the liquid phases being comprised from 10 nL/min to 10 L/min, said pressures of the gas and the liquid phases being comprised from 10 mbar to 20 bar, said flow rates being optionally varied during step A of bubbling, leading to the formation of from 1 to 10 populations of pores, in particular 2 to 10 populations of pores, or 1 or 2 populations of pores, each population of pores having a distinct pore size and polydispersity index, said pore size being comprised from 50 nm to 200 µm, in particular from 50 nm to less than 10 µm, said polydispersity index being comprised from 1 to 30%.

"with pressures of the gas and the liquid phases" is meant the pressure at which the gas and liquid phases are introduced in reactor A. These pressures relate to the overpressures relative to the atmospheric pressure.

In order to obtain a desired pore size in the final solid foam (or bubble size in the corresponding liquid foam from which it was derived) An appropriate reactor A can be selected, by taking into account the specifications of the device such as the microfluidic channel sizes.

In addition, the pore size can be controlled by controlling the flow rate of the gas phase and/or the liquid phase. Indeed, a high flow rate of the gas phase leads to a liquid foam having smaller bubbles and thus ultimately to a solid foam having smaller pore sizes. Without being bound to theory, the relation between the bubble diameter, the system parameters, and the gas and liquid flow rates is as shown in Formula 4 (Colloids and Surfaces A: physicochemical and Engineering Aspects, 2009, 346(1-3), p. 5-10):

$$D_{bubble} = (1.19 \pm 0.2) D_{channel} \frac{Q_{gas}}{Q_{liquid}}^{0.33 \pm 0.06} \quad \text{Formula 4}$$

Wherein:

$D_{bubble}$ represents the bubble diameter, $D_{channel}$ represents the channel diameter, $Q_{gas}$ and $Q_{liquid}$ respectively represent the gas and liquid flow rates.

Figure 15:
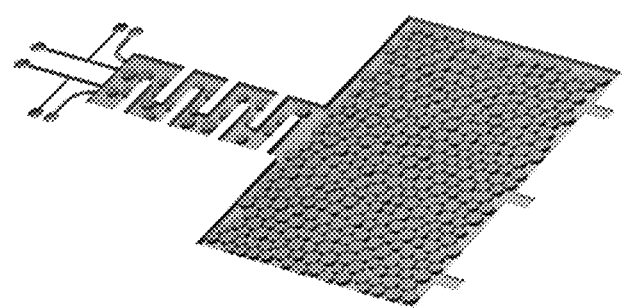
FIG. 15 represents an image showing a microfluidic device allowing for the formation of 2 populations of bubbles. The device comprises separate T junctions serving as two distinct droplet/bubble generators.

The use, in the same experimental setup, of 2 or more microfluidic devices, having different characteristics, in particular in terms of the size of the microfluidic channels, allows for the preparation of 2 or more populations of pores. Reactor A in this case consists of 2 or more microfluidic devices. Different populations can also be created by varying the flow rate of the gas and liquid phases as previously discussed. Two or more bubble generators can for instance be used, allowing for the introduction in reactor A of two or more populations of bubbles comprised in the liquid foam. A microfluidic device, having two T-junction bubble generators, such as shown in FIG. 15 can for instance be used for these purposes (Ricouvier et al., *Optimizing Hyperuniformity in Self-Assembled Bidisperse Emulsions Phys. Rev. Lett.* 119, 208001)

In yet another embodiment, the present invention relates to a process as previously defined, wherein the 2 to 10 populations of pores, in particular 2 populations of pores, have both different pore sizes and different polydispersity indexes.

In yet another embodiment, the present invention relates to a process as previously defined, wherein the 2 to 10 populations of pores, in particular 2 populations of pores, have different pore sizes, but substantially the same polydispersity index.

In yet another embodiment, the present invention relates to a process as previously defined, comprising:

a step A of microfluidic bubbling of a gas phase through a liquid phase comprising a cross-linkable polymer, a cross-linking agent, a solvent and optionally a stabilizing agent, to obtain an organic liquid polymeric foam comprising a liquid continuous phase and bubbles, and a step B of cross-linking of said liquid polymeric foam comprising a liquid continuous phase and bubbles, to obtain a first layer of solid polymeric foam comprising a solid continuous phase and pores in reactor B, and a sequence of leaving the previously prepared first layer of solid foam in reactor B, and repeating steps A and B to obtain a second layer of solid polymeric foam on top of the first layer of solid polymeric foam, thus increasing the total amount of the solid polymeric foam, to obtain a solid three-dimensional polymeric foam, said step B of cross-linking being carried out in such a way that cross-linking is only partial, ensuring adhesion between the first and second layers, preferably during a time comprised from 1 to 2 minutes, preferably 1 minute.

step A of said repeating steps A and B being optionally carried out using different reactors A, in particular different microfluidic chips.

With "cross-linking is only partial" is meant that the cross-linking reaction is not completed and in particular that the majority of polymer chains are still not linked one to the other.

In a preferred embodiment, the present invention relates to a process as previously defined, wherein the sequence leaving the previously prepared first layer of solid foam in reactor B, and repeating steps A and B, is carried out from 1 to 100 times, in particular from 1 to 10 times.

With "1 to 100 times" should also be understood the following ranges: 1 to 90, 1 to 80, 1 to 70, 1 to 60, 1 to 50, 1 to 40, 1 to 30, 1 to 20, 10 to 100, 20 to 100, 30 to 100, 40 to 100, 50 to 100, 60 to 100, 70 to 100, 80 to 100, 90 to 100, 10 to 90, 20 to 80, 30 to 70, 40 to 60, 1 to 90, 1 to 80, 1 to 70, 1 to 60, 1 to 50, 1 to 40, 1 to 30, 1 to 20, and in particular 1 to 10.

In a preferred embodiment, the present invention relates to a process as previously defined, wherein the height of the first layer is comprised form 100 nm to 1 mm.

With "100 nm to 1 mm" should also be understood the following ranges: 100 to 900 nm, 100 to 800 nm, 100 to 700 nm, 100 to 600 nm, 100 to 500 nm, 100 to 400 nm, 100 to 300 nm, 100 to 200 nm, 200 nm to 1 mm, 300 nm to 1 mm, 400 nm to 1 mm, 500 nm to 1 mm, 600 nm to 1 mm, 700 nm to 1 mm, 800 nm to 1 mm, 900 nm to 1 mm, 200 to 900 nm, 300 to 800 nm, 400 to 700 nm, 500 to 600 nm.

In yet another embodiment, the present invention relates to a process as previously defined, further comprising:

a step C of applying pressure to the liquid three-dimensional polymeric foam as obtained by step A, resulting in a compressed organic liquid three-dimensional polymeric foam, said pressure being comprised from 1.1 to 100 bar, preferably from 1.1 to 30 bar, said applying pressure being in particular carried out for a time comprised from 1 to 10 minutes, said pressure being applied in reactor B.

In this embodiment, pressure is applied to the liquid foam. This results in compression of the liquid foam and a decrease in bubble size. Pression is released upon completion of the cross-linking step, resulting in a compressed solid foam having decreased pore sizes as compared to the non-compressed solid foam.

Without being bound to theory, the decrease of bubble-size (or pore size) can be calculated according to Boyle's law. Thus, an uncompressed foam having pores of radius R1 at atmospheric pressure P1, will have pores of radius R2 at pressure P2 as calculated with Formula 5:

$$P1R1^3 = P2R2^3 \qquad \text{Formula 5}$$

In a preferred embodiment, the present invention relates to a process as previously defined, wherein the step B of cross-linking and the step C of applying pressure are carried out simultaneously, resulting in simultaneous compression and cross-linking of said liquid three-dimensional polymeric foam, to obtain an organic solid three-dimensional polymeric foam.

In yet another embodiment, the present invention relates to a process as previously defined, further comprising:

a step C of applying pressure to the liquid three-dimensional polymeric foam as obtained by step A, resulting in a compressed organic liquid three-dimensional polymeric foam, said pressure being comprised from 1.1 to 100 bar, preferably from 1.1 to 30 bar, said applying pressure being in particular carried out for a time comprised from 1 to 10 minutes, said pressure being applied in reactor B, wherein the step B of cross-linking and the step C of applying pressure are optionally carried out simultaneously, resulting in simultaneous compression and cross-linking of said liquid three-dimensional polymeric foam, to obtain an organic solid three-dimensional polymeric foam.

In yet another embodiment, the present invention relates to a process as previously defined, wherein said solid three-dimensional polymeric foam comprises a solid continuous phase, the volumetric fraction of which is:

comprised from 5 to 7% compared to the total volume of the foam, said foam having a crystalline body cubic centered (BCC) structure, or comprised from more than 7 and 10% compared to the total volume of the foam, said foam having both a crystalline body cubic centered (BCC) structure and a crystalline face cubic centered (FCC) structure, or comprised from more than 10 to 25% compared to the total volume of the foam, said foam having a crystalline face cubic centered (FCC) structure In yet another embodiment, the present invention relates to a process as previously defined, wherein the foam has a crystalline Weaire-Phelan structure, said foam having a volumetric fraction of the solid continuous phase comprised from 5 to 7% compared to the total volume of the foam.

Crystalline Weaire-Phelan can be prepared according to the process of the present Invention. In this case, the internal walls of reactor B should be templated with the geometry of the Weaire-Phelan structure itself, as described by Gabbrielli et al., *Philosoph. Mag. Letters,* 2012, 92 (1), p. 1-6

In yet another embodiment, the present invention relates to a process as previously defined, wherein said solid three-dimensional polymeric foam comprises a solid continuous phase having:

a crystalline body cubic centered (BCC) structure, said foam having a volumetric fraction of the solid continuous phase comprised from 5 to 7% compared to the total volume of the foam, or both a crystalline body cubic centered (BCC) structure and a crystalline face cubic centered (FCC) structure, said foam having a volumetric fraction of the solid continuous phase comprised from more than 7 and 10% compared to the total volume of the foam, or a crystalline face cubic centered (FCC) structure, said foam having a volumetric fraction of the solid continuous phase comprised from more than 10 to 25% compared to the total volume of the foam, or a crystalline Weaire-Phelan structure, said foam having a volumetric fraction of the solid continuous phase comprised from 5 to 7% compared to the total volume of the foam.

In a preferred embodiment, the present invention relates to a process as previously defined, wherein the cross-linkable organic polymer is chosen from:

biopolymers, in particular polysaccharides, in particular polysaccharides of natural origin, said polysaccharides being in particular chosen from chitosan, hyaluronic acid, alginate, starch, dextrin, glycogen, dextran, gellan, pullulan, cellulose, hemicellulose, pectin, curdlan, agar-agar, alginate, carrageenan, chitosan, hyaluronic acid, xanthan, zooglan and succinoglycan, polyvinyl alcohols polylactic acids (PLA), Poly-L-Lactic acids (PLLA), poly(lactic-co-glycolic acids) (PLGA), polyethylene glycols (PEG), polyacrylates (PA), polymethacrylates (PMA), Poly(methyl methacrylates) (PMMA), polystyrenes (PS), poly-N-vinylpyrrolidones (PVP), Polyethyleneglycol acrylates (PEGA), polyethyleneglycol methacrylates (PEGMA), polyethyleneglycol diacrylates (PEGMA), polyethyleneglycol dimethacrylates (PEGDMA), or mixtures of said organic polymers.

In a preferred embodiment, the present invention relates to a process as previously defined, wherein the cross-linking agent is chosen from the group of:

glycerol-phosphate disodium salt, glyoxal, genipin, sodium tripolyphosphate (TPP), divinyl sulfone (DVS), calcium chloride ($CaCl_2$), calcium acetate, glutaraldehyde, polyaldehydes and butanediol glycidyl ether, or mixtures of said cross-linking agents.

In a preferred embodiment, the present invention relates to a process as previously defined, wherein the stabilizing agent is a surfactant.

Surfactants allow for the lowering of the surface tension of the liquid foam formed during step A of microfluidic bubbling, resulting in stabilization. In addition, they act as foaming agents, helping to form the foam.

In a preferred embodiment, the present invention relates to a process as previously defined, wherein the surfactant is an anionic surfactant, a non-ionic surfactant, a cation surfactant, or an amphoteric surfactant, said anionic surfactant being in particular chosen from the group comprising:

sodium dodecyl sulfate, sodium laureth sulfate, ammonium lauryl sulfate, and sodium palmitate, said non-ionic surfactant being in particular chosen from the group comprising:
  decyl glucoside, poloxamers, and polyethylene glycol-based surfactants, coco glycoside, lauryl glycoside, polysorbate-20, or cetyl alcohol, and lauryl alcohol,
said cationic surfactant being in particular chosen from the group comprising:
  quaternary ammonium salts, in particular cetyltrimethylammonium bromide, cetrimonium chloride, distearoylethyl diimonium chloride, and behentrimonium chloride,
said amphoteric surfactant being in particular chosen from the group comprising:
  cocamidopropyl betaine, sodium lauroamphoacetate, and sodium cocoyl glutamate.

Specific examples of commercial products that can be used as surfactant include:
Lutensol® AT25,
Plantacare® 2000 UP,
Synperonic® A7, Pluronic® F-127 and
Cremophor® RH455.

In a preferred embodiment, the present invention relates to a process as previously defined, wherein the cross-linkable organic polymer is chitosan and the cross-linking agent is glyoxal.

In a preferred embodiment, the present invention relates to a process as previously defined, wherein the solvent is water, or a mixture of water and acetic acid.

In a preferred embodiment, the present invention relates to a process as previously defined, wherein the gas phase consists of a mixture of air and a water insoluble gas, in particular perfluorohexane $C_6F_{14}$.

The water insoluble gas, such as perfluorohexane, permits to limit aging of the foam, that is to limit the occurrence of changes in the structure, resulting in destruction of the foam.

In yet another embodiment, the present invention concerns a process as previously described, wherein the cross-linkable organic polymer is chosen from:
  biopolymers, in particular polysaccharides, in particular polysaccharides of natural origin, said polysaccharides being in particular chosen from chitosan, hyaluronic acid, alginate, starch, dextrin, glycogen, dextran, gellan, pullulan, cellulose, hemicellulose, pectin, curdlan, agar-agar, alginate, carrageenan, chitosan, hyaluronic acid, xanthan, zooglan and succinoglycan,
  polyvinyl alcohols polylactic acids (PLA), Poly-L-Lactic acids (PLLA), poly(lactic-co-glycolic acids) (PLGA), polyethylene glycols (PEG),
  polyacrylates (PA), polymethacrylates (PMA), Poly(methyl methacrylates) (PMMA), polystyrenes (PS), poly-N-vinylpyrrolidones (PVP), Polyethyleneglycol acrylates (PEGA), polyethyleneglycol methacrylates (PEGMA), polyethyleneglycol diacrylates (PEGDA), polyethyleneglycol dimethacrylates (PEGDMA),
or mixtures of said organic polymers,
and wherein the cross-linking agent is chosen from the group of:
  glycerol-phosphate Disodium® salt, glyoxal, genipin, sodium tripolyphosphate (TPP), divinyl sulfone (DVS), calcium chloride ($CaCl_2$), calcium acetate, glutaraldehyde, polyaldehydes and butanediol glycidyl ether,
or mixtures of said cross-linking agents,
and/or
wherein the stabilizing agent is a surfactant, in particular wherein the surfactant is an anionic surfactant, a non-ionic surfactant, a cation surfactant, or an amphoteric surfactant,
said anionic surfactant being in particular chosen from the group comprising:
  sodium dodecyl sulfate, sodium laureth sulfate, ammonium lauryl sulfate, and sodium palmitate,
said non-ionic surfactant being in particular chosen from the group comprising:
  decyl glucoside, poloxamers, and polyethylene glycol-based surfactants, coco glycoside, lauryl glycoside, polysorbate-20, or cetyl alcohol, and lauryl alcohol,
said cationic surfactant being in particular chosen from the group comprising:
  quaternary ammonium salts, in particular cetyltrimethylammonium bromide, cetrimonium chloride, distearoylethyl diimonium chloride, and behentrimonium chloride,
said amphoteric surfactant being in particular chosen from the group comprising:
  cocamidopropyl betaine, sodium lauroamphoacetate, and sodium cocoyl glutamate.
and/or
wherein the solvent is water, or a mixture of water and acetic acid,
and/or
wherein the gas phase consists of a mixture of air and a water insoluble gas, in particular perfluorohexane $C_6F_{14}$.

In yet another embodiment, the present invention relates to a process as previously defined, wherein the liquid phase further comprises nanoparticles, in particular nanoparticles chosen from the group of:
  metal oxide nanoparticles, in particular titanium dioxide ($TiO_2$) or aluminum oxide ($Al_2O_3$),
  metallic nanoparticles, in particular silver (Ag), gold (Au), iron (Fe), nickel (Ni), copper (Cu) or germanium (Ge),
  bi-metallic nanoparticles, in particular gallium arsenide (GaAs), lead telluride (PbTe), or iron platinum (FePt),
  tri-metallic nanoparticles, in particular aluminum gallium arsenide ($Al_xGa_{1-x}As$),
  ceramic nanoparticles, in particular silicon carbide (SiC) or tungsten carbide (WC),
  magnetic nanoparticles, in particular iron oxide ($Fe_2O_3$),
  silica ($SiO_2$) nanoparticles,
  polymeric nanoparticles,
or mixtures thereof.

Adding nanoparticles to the liquid phase helps for instance to stabilize the liquid foam (*J. Chem. Soc. Trans.*, 1907, p. 2001)

In yet another embodiment, the present invention relates to a process as previously defined, wherein the liquid phase further comprises an active pharmaceutical ingredient, in particular chosen from the group consisting of:
  anti-inflammatory drugs, in particular diclofenac, ibuprofen, acetyl salicylic acid, or steroid based anti-inflammatory drugs,
  anti-cancer drugs, in particular paclitaxel, docetaxel, or doxorubicin,
  analgesics, in particular morphine,
  antibiotics, in particular penicillin or sulfonamide antibiotics,
said active pharmaceutical ingredient optionally comprising a radiotracer, in particular chosen from $^{14}C$, $^{51}Cr$, $^{18}F$, $^{67}Ga$ or $^{123}I$.

In yet another embodiment, the present invention relates to a process as previously defined, wherein the liquid phase further comprises a contrast agent, in particular ipodate sodium.

As indicated above, including an ingredient, such as a contrast agent, in the liquid phase, leads to a structure wherein the agent is comprised within the internal structure of the foam.

In yet another embodiment, the present invention relates to a process as previously defined,
wherein the liquid phase further comprises a dye, wherein the dye is in particular an organic dye, in particular a water-soluble organic dye, pigments, or quantum dots, said organic dye being in particular chosen from the group comprising:
Fluorescein, Eosin, Amaranth, Sanolin Blue NBL, Anthocyanins, methylene blue, indocyanine green (ICG), Rhodamine B, Cyanine, Evans Blue, Primulin, Isamine Blue, and Naphtol green B.

In yet another embodiment, the present invention relates to a process as previously defined, wherein the nanoparticles, the active pharmaceutical ingredient, the contrast agent, or the dye comprised in the liquid phase further is coupled to a fluorophore, in particular chosen from fluorescein or rhodamine B.

Conventional methods, such as immerging an already formed foam into a solution containing additional ingredients, i.e. nanoparticles, an active pharmaceutical ingredient, a contrast agent, and/or a dye, would result in a foam comprising said ingredients on the surface of the foam, that is the parts of the foam that are in contact with the solution.

The presence of said ingredients in the liquid phase, during step A of the production of the foam, results in the ingredients being comprised within the liquid continuous phase of the foam formed during step A of microfluidic bubbling, and ultimately within the solid continuous phase of the foam formed in step B of cross-linking.

In yet another embodiment, the present invention relates to a process as previously defined, wherein the liquid phase further comprises:
nanoparticles, in particular chosen from the group of:
metal oxide nanoparticles, in particular titanium dioxide ($TiO_2$) or aluminum oxide ($Al_2O_3$),
metallic nanoparticles, in particular silver (Ag), gold (Au), iron (Fe), nickel (Ni), copper (Cu) or germanium (Ge),
bi-metallic nanoparticles, in particular gallium arsenide (GaAs), lead telluride (PbTe), or iron platinum (FePt),
tri-metallic nanoparticles, in particular aluminum gallium arsenide ($Al_xGa_{1-x}As$),
ceramic nanoparticles, in particular silicon carbide (SiC) or tungsten carbide (WC),
magnetic nanoparticles, in particular iron oxide ($Fe_2O_3$),
silica ($SiO_2$) nanoparticles,
polymeric nanoparticles,
or mixtures thereof,
or
an active pharmaceutical ingredient, in particular chosen from the group of:
anti-inflammatory drugs, in particular diclofenac, ibuprofen, acetyl salicylic acid, or steroid based anti-inflammatory drugs,
anti-cancer drugs, in particular paclitaxel, docetaxel, or doxorubicin,
analgesics, in particular morphine,
antibiotics, in particular penicillin or sulfonamide antibiotics,
said active pharmaceutical ingredient optionally comprising a radiotracer, in particular chosen from $^{14}C$, $^{51}Cr$, $^{18}F$, $^{67}Ga$ or $^{123}I$,
or
a contrast agent, in particular ipodate sodium,
or
a dye, in particular an organic dye, more in particular a water-soluble organic dye, pigments, or quantum dots,
said organic dye being in particular chosen from the group comprising:
Fluorescein, Eosin, Amaranth, Sanolin Blue NBL, Anthocyanins, methylene blue, indocyanine green (ICG), Rhodamine B, Cyanine, Evans Blue, Primulin, Isamine Blue, and Naphtol green B,
said nanoparticles, active pharmaceutical ingredient, contrast agent or dye being optionally coupled to a fluorophore, in particular chosen from Fluorescein or Rhodamine B.

In a preferred embodiment, the present invention relates to a process as previously defined, wherein the cross-linkable organic polymer is present in the liquid phase at a concentration comprised from 0.1 to 20 w/v %.

With "0.1 to 20 w/v %" should also be understood the following ranges: 0.1 to 15 w/v %, 0.1 to 10 w/v %, 0.1 to 5 w/v %, 0.1 to 1 w/v %, 0.1 to 0.5 w/v %, 0.5 to 20 w/v %, 1 to 20 w/v %, 5 to 20 w/v %, 10 to 20 w/v %, 15 to 20 w/v %, 1 to 15 w/v %, and 5 to 15 w/v %

The concentration of cross-linkable organic polymer in the liquid phase depends on the polymer used.

A concentration of less than 0.1 w/v % results in the liquid foam not being formed, whereas a higher than 20 w/v % could lead to precipitation of the polymer from the liquid phase when cooling reactor A. For instance, in the case of chitosan, a concentration of 0.3 to 2 w/v % is preferably used to obtain a foam according to the present invention.

In a preferred embodiment, the present invention relates to a process as previously defined, wherein the cross-linking agent is present in the liquid phase at a concentration comprised from 0.1 to 50 w/w %, in particular from 5 to 20 w/w %.

With "0.1 to 50 w/w %" should also be understood the following ranges: 0.1 to 40 w/w %, 0.1 to 35 w/w %, 0.1 to 30 w/w %, 0.1 to 25 w/w %, 0.1 to 20 w/w %, 0.1 to 15 w/w %, 0.1 to 10 w/w %, 0.1 to 30 w/w %, 0.1 to 1 w/w %, 1 to 30 w/w %, 5 to 30 w/w %, 10 to 30 w/w %, 15 to 30 w/w %, 20 to 30 w/w %, to 30 w/w %, 5 to 25 w/w %, 5 to 25 w/w %, and 10 to 20 w/w %.

In a preferred embodiment, the present invention relates to a process as previously defined, wherein the surfactant is present in the liquid phase at a concentration comprised from 1/10 to 100 times the critical micelle concentration of the surfactant, in particular 1 to 20 times.

In yet another embodiment, the present invention relates to a process as previously defined, wherein the reactor A is a microfluidic chip, in particular a microfluidic flow-focusing chip.

In yet another embodiment, the present invention relates to a process as previously defined, wherein the reactor B is placed in an oven, or on a heating plate.

In yet another embodiment, the present invention relates to a process as previously defined, wherein the foam has a flexibility/elasticity comprised from 10 to $10^7$ Pa.

In yet another embodiment, the present invention relates to a process as previously defined, wherein the foam has a pore size comprised from 50 nm to 100 µm, in particular from 50 nm to 50 µm, more in particular 50 nm to less than 10 µm.

The present invention also concerns an organic solid three-dimensional polymeric foam, such as obtained by the process previously described, said foam having:
- a pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a polydispersity index comprised from 1 to 30%.

The present invention also concerns an organic solid three-dimensional polymeric foam, such as obtained by the process previously described, said foam having:
- a pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a flexibility/elasticity comprised from 10 to $10^7$ Pa,
- a polydispersity index comprised from 1 to 30%,
wherein said solid three-dimensional polymeric foam is ordered over a volume of at least 100 pores.

The present invention also concerns an organic solid three-dimensional polymeric foam, such as obtained by the process as previously defined, said foam having:
- a pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a flexibility/elasticity comprised from 10 to $10^7$ Pa,
- a polydispersity index comprised from 1 to 30%,
- a volume higher than 1 mm$^3$, in particular comprised between 100 mm$^3$ and 10 cm$^3$, more in particular comprised between 1 and 3 cm$^3$,
wherein said solid three-dimensional polymeric foam is ordered over a volume of at least 100 pores.

The present invention also concerns a medium comprising an organic solid three-dimensional polymeric foam as previously defined, or such as obtained by the process as previously defined, and a solvent chosen from:
- ethanol,
- DMSO,
- acetone,
- diethyl ether,
- dimethyl formamide,
- cell culture media,
- water at a pH comprised between 3 and 10,
or mixtures of said solvents,
said organic solid three-dimensional polymeric foam being stable at 25° C. for several days, in particular from 1 to 3 days.

APPLICATIONS

The foams according to the present invention can be used in various applications such as insulation applications, food packaging applications, photonics, or biomedical applications.

The present invention thus also concerns the use of an organic solid three-dimensional polymeric foam consisting of, or comprising a solid continuous phase and pores, wherein said solid continues phase is a cross-linked organic polymer, wherein said pores are separated by plateau borders, the meeting points of said plateau borders forming nodes,
for the preparation of a solid self-assembled three-dimensional photonic structure, wherein said foam has:
- a pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a polydispersity index comprised from 1 to 30%,
wherein said solid three-dimensional polymeric foam is ordered over a volume of at least 100 pores.

In a preferred embodiment, the present invention thus also concerns the use of an organic solid three-dimensional polymeric foam for the preparation of a solid self-assembled three-dimensional photonic structure, said foam having an open pore structure.

The present invention also concerns the use of an organic solid three-dimensional polymeric foam consisting of, or comprising a solid continuous phase and pores, wherein said solid continues phase is a cross-linked organic polymer, wherein said pores are separated by plateau borders, the meeting points of said plateau borders forming nodes,
as a cell culture medium,
wherein said foam has:
- a pore size comprised from 50 nm to 200 μm, in particular from 50 nm to less than 10 μm, or from 10 to 200 μm,
- a volumetric fraction of the solid continuous phase comprised from 0.1 to 60%, with respect to the total volume of the foam,
- a polydispersity index comprised from 1 to 30%,
wherein said solid three-dimensional polymeric foam is ordered over a volume of at least 100 pores.

The process according to the Invention allows a tuning of the mechanical properties.

The access to a material with a large range of elasticities is crucial in 3D cell culture for tissue engineering. Adjusting the scaffold pore size to the cell size and the scaffold elasticity to the human tissue allows to mimic the natural environment of the cell and it can be fundamental for the mechanically-driven differentiation and proliferation.

According to a particular embodiment the cells which can be cultured are chosen amongst bone cells, blood cells, muscle cells, skin cells, nerve cells, endothelial cells and tumor cells as for example HT-29 cells.

The present invention also relates to a method for culturing cells, wherein the method comprises a step of providing cells to a cell culture medium comprising an organic solid three-dimensional polymeric foam consisting of, or comprising a solid continuous phase and pores, wherein said solid continues phase is a cross-linked organic polymer, wherein said pores are separated by plateau borders, the meeting points of said plateau borders forming nodes,
wherein said foam has:
- a pore size comprised from 50 nm to 200 μm, or from 50 nm to less than 10 μm, or from 10 to 200 μm,
- a volumetric fraction of the solid continuous phase comprised from 0.1 to 60%, with respect to the total volume of the foam,
- a polydispersity index comprised from 1 to 30%,
wherein said solid three-dimensional polymeric foam is ordered over a volume of at least 100 pores,
in which the cells grow and multiply.

The following figures and examples illustrate the invention, without limiting its scope.

EXAMPLES

Example 1 Preparation of Solid Three-Dimensional Polymeric Foams—General Remarks Tests were performed with different microfluidic geometries allowing a bubble by bubble generation:

T-junction, co-flow and Flow Focusing (FF) geometries.

For most of the experiments, a FF geometry was adopted because it can offer a better flow stability by limiting the spontaneous oscillations of the fluids flow. In such a geometry, the liquid stream, being the polymer water solution (liquid phase), focuses the gas jet (gas phase) through a tiny orifice and periodically pinches it off forming the bubbles. At sufficient bubbles' concentration, they self-assemble and form a foam that is stabilized by adding surfactants to the liquid phase. Depending on the concentration of the bubbles, the foam can be wet, at small air volume fraction, or inversely dry. In the latter case, the films separating the bubbles get thin and crystalline foams, with hexagonal polyhedral pores, are obtained. Films separating bubbles can be thin like in the case of closed cell foams or can be fully destroyed in open cell foams.

Example 2 Preparation of a Solid Three-Dimensional Chitosan Foam—Pore Size 30 µm Preparation of the Liquid Phase An aqueous solution of chitosan, a biopolymer extracted from shrimp shells, at a concentration between 0.3 and 2% w/v was prepared. In this particular example, chitosan having a medium molecular weight of $0.2*10^6$ and $0.4*10^5$ g/mol, Sigma Aldrich (0.416 g), was dissolved in milliQ water (50 ml) leading to a an aqueous solution of chitosan at a concentration of 0.8% w/w. Acetic acid was also added at a concentration of around 0.1 mol/l. Dissolution and homogenization were obtained by stirring for at least 2 days at room temperature. Lutensol AT 25 (fatty alcohol alkoxylate with a C16/C18 chain and a degree of ethoxylation of 25, M=1360 g mol-1, provided by BASF), a non-ionic surfactant, was added at a concentration of 4 g/L. The surfactant permits stabilization of the liquid/air interface. The cross-linking agent Glyoxal ($C_2H_2O_2$, 40% in water, CAS: 107-22-2, purchased from Sigma Aldrich) was added to the thus obtained liquid phase at a concentration of around 5% v/v. The injection flow of the thus prepared liquid phase was adjusted such that a liquid fraction of around 13% was obtained.

Preparation of the Gas Phase

Air was mixed with a gas that is less soluble in water, perfluorohexane (PFH, $C_6F_{14}$). This gas is classically used in foams production to hinder Oswald ripening. The set-up comprises a tube filled at 60% with liquid perfluorohexane and 40% with air. The flow of air drags along a substantial amount of gaseous perfluorohexane. The injection flow of the thus prepared gas phase was adjusted such that a gas fraction of around 87% was obtained.

Formation of the Liquid Foam

The experimental set-up as shown in FIG. 5 (or FIG. 6) was used (a microfluidic flow-focusing chip). The chip, comprising microchannels having a height of 50 µm, and a nozzle width of 30 µm, contains two entries, one for injecting the liquid phase, and one for injecting the gas phase. At the intersection, where the gas phase meets the liquid phase, micro-bubbles of gas were encapsulated in the continuous liquid phase. The bubble-size was controlled by the gas- and liquid flow rates using an MFCS pressure control unit (Fluigent).

The temperature of the microfluidic chip was fixed at 4-6° C. in order to suppress or prevent cross-linking until the liquid foam was outside the microfluidic equipment. The thus obtained liquid foam layer was drained from the microfluidic chip under gravity.

Formation of the Solid Foam by Cross-Linking

Figure 7:
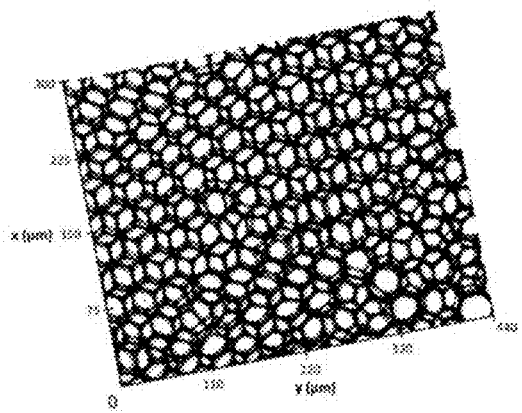
FIG. 7 represents the 3D reconstruction by confocal microscopy of the foam obtained in example 2. The polyhedral pores have a diameter of 30 µm and present a fine spatial organization.

The liquid foam was then heated to 70° C. during 3 minutes, during which cross-linking occurred. The structure quickly solidified. Thus, a solid ordered foam, having connected polyhedral pores having a diameter of 30 µm was obtained as shown in FIG. 7. Said foam comprising chitosan cross-linked with glyoxal.

Example 3 Multi-Layer Formation to Obtain a Foam Sample Higher than 1-3 mm

After the bubble-by-bubble production, the bubbles self-assembled in very ordered patterns and started to drain under the gravity. By placing it in an oven at 70° C. for about 2-3 min (Cross-linking temperature of the chitosan is 40° C.), this same layer was cross-linked to make a solid layer. It is to mention that in order to minimize the evolution of structure during the solidification process because of gravity-induced drainage, the foam was generated following a "layer-by-layer" process: a first layer, of which the height is smaller than the capillary length of the liquid phase (around 1-3 mm), was formed and send to cross-linking. Before the polymerization was complete (to ensure the adherence between the different layers), another layer was added above, and the same operation was reiterated until the desired height of the sample was reached.

Figure 8:
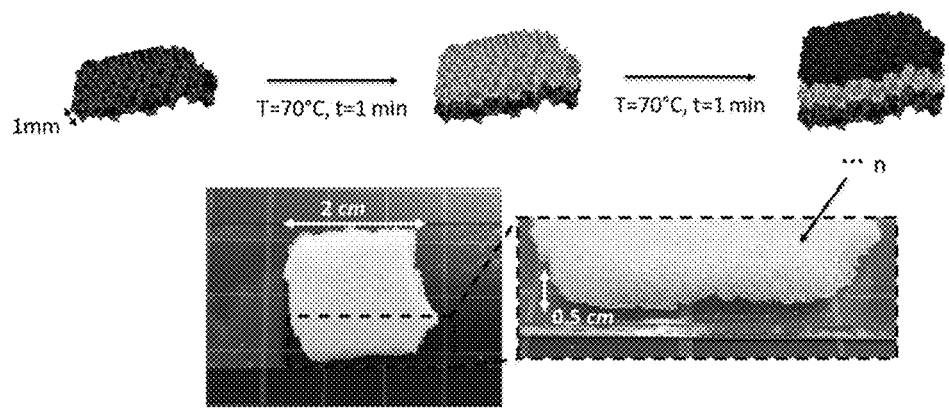
FIG. 8 represents the layer-by-layer process allowing to generate a multiple-layer foam within an optimal control over the structure.

FIG. 8 sums up the key steps that the foam goes through in order to obtain de samples of this example, ready to be characterized.

Example 4 Decreasing the Pore Size Using Pressure—General Procedure

The liquid foam, obtained by using the Flow-Focusing microfluidic set-up, is collected directly inside a high pressure cell (a sealed vessel that can be pressurized up to hundreds of bar using high pressure tank of air or nitrogen gas). The process consists of applying a high pressure, at once or stepwise, (from 1 bar up to 30 bar) to the liquid foam inside the pressure cell for a brief time (from 1 millisecond to 10 min).

The increasing applied pressure inside the cell induces a decrease of the foam volume and mainly, a decrease of bubble sizes. Once the desired size of the bubbles is reached, the pressurization is stopped and the pressure cell is heated to a range comprised from 30 and 100° C. in order to initiate the cross-linking of the 3D polymer foam structure.

Example 5 Analysis of the Pore Size Distribution and Polydispersity Analysis—a Mono-Disperse Foam with 100 µm Pore Size The foam was obtained according to the general procedure of example 1, the pore size distribution and the index of polydispersity (PDI) were analyzed as follows. An image-processing based particle size analysis using Image)/Fiji where the particles are represented by the bubbles was performed.

First, high quality images of the sample were taken using confocal microscopy (from Leica Microsystems) in transmission. After setting the scale and adjusting the brightness of the picture, particles were "thresholded", meaning that a threshold level of grey was fixed, and all the pixels with a higher value of grey were turned into white and the others into black, in a way to segment the image into features of interest (bubbles/pores) and background (continuous phase).

Then, measurements of different parameters were performed using the software by calculating the area of each bubble/pore.

Starting from there, the polydispersity index was calculated according to Formula 3:

$$PDI = \frac{100\sqrt{\langle d^2 \rangle - \langle d \rangle^2}}{\langle d \rangle} \quad \text{Formula 3}$$

where d is the diameter of the bubbles/pores. PDI calculated in this way is a percentage. The bubble/pore size distribution was also calculated.

In the present example, a foam having very regular, monodisperse and ordered structure with a mean size around 100 μm was prepared.

Figure 9:
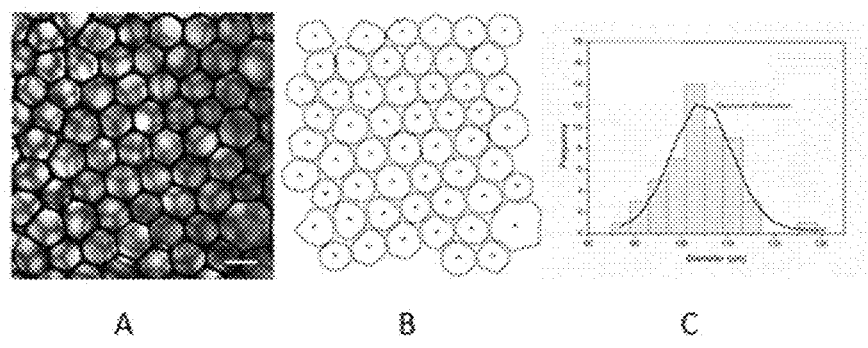
FIG. 9 represents analyses of the foam as obtained in example 5. A represents a bright-field transmission image of the honeycomb-like structure of the obtained foam. Scale bar 100 µm, B represents the outlines of the different pores obtained with Particle Analysis tool (ImageJ), C represents a Gaussian size distribution of the foam.

The results of the above analysis on the thus obtained liquid foam are shown in FIG. 9. The mean diameter of the bubbles was calculated to be around 103 μm. The standard deviation value is of 7.13 μm and the PDI is equal to 6.7% indicating a monodisperse distribution of bubbles.

Figure 10:
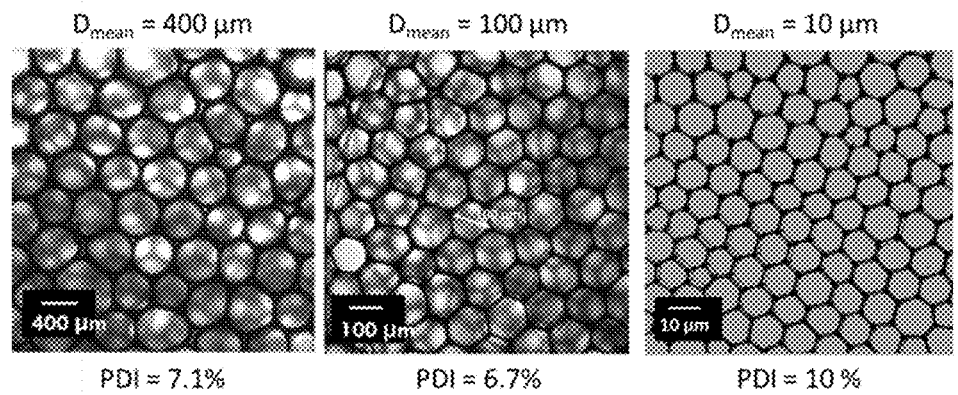
FIG. 10 represents the bright-field transmission images of the foams as obtained in example 5. A represents a foam having a pore size of 400 µm, and a PDI of 7.1%, B represents a foam having a pore size of 100 µm, and a PDI of 6.7%, C represents a foam having a pore size of 10 µm, and a PDI of 10% as analyzed with the particle analysis tool (ImageJ).

Example 6 Analysis of the Pore Size Distribution and Polydispersity Analysis—Monodisperse Foams with Various Pore Sizes Monodisperse foams with various pore sizes have been prepared using the general procedure of example 1. The thus obtained foams were analyzed in the same way as for example 4. The results were shown in FIG. 10. As can be seen from FIG. 10, highly monodisperse foams were obtained having different bubble sizes. Thus, a foam having a pore size of 10 μm was prepared, as well as a foam having a pore size of 100 μm, and a foam having a pore size of 400 μm.

Example 7 Preparation of a Solid Chitosan Foam Having a Pore Size of 100 μm and Containing Silicon Carbide (SiC) Nanoparticles Having a Size of 80 nm Liquid Phase Preparation An aqueous dispersion of silicon carbide nanoparticles was added to a solution containing acetic acid (0.3 mol/l) and water. A mixture of chitosan (1 w/w %) was added, followed by Lutensol® AT25 at a concentration of 4 g/L. The cross-linking agent glyoxal (40 v/v %) was then added to the solution to a concentration of 0.5 v/v %.

The injection flow of the thus prepared liquid phase was adjusted such that a liquid fraction of around 25% was obtained.

Preparation of the Gas Phase

Air was mixed with a gas that was less soluble in water, perfluorohexane (PFH, $C_6F_{14}$). This gas was classically used in foams production to hinder Oswald ripening.

The injection flow of the thus prepared gas phase was adjusted such that a gas fraction of around 75% was obtained.

Formation of the Liquid Foam

The experimental setup was such as described in example 2, but having micro-channels of a height of 50 μm and a nozzle width of 100 μm.

The temperature of the microfluidic chip was fixed at 4-6° C. in order to suppress or prevent cross-linking until the liquid foam is outside the microfluidic equipment. The thus obtained liquid foam layer was drained from the microfluidic chip.

Formation of the Solid Foam by Cross-Linking

Figure 11:
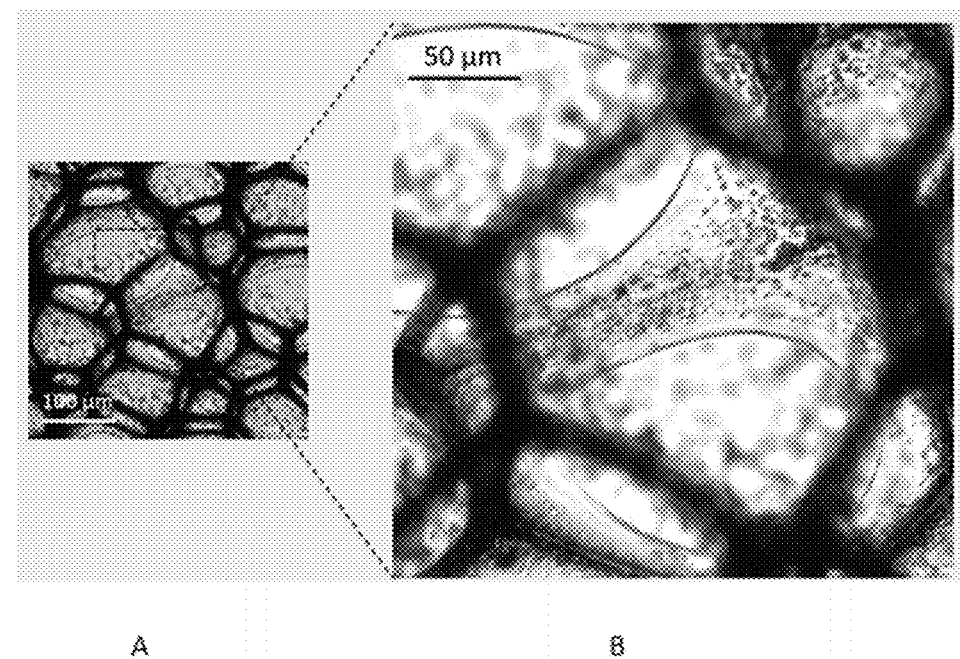
FIG. 11 represents a bright-field confocal image of a solid chitosan foam containing nanoparticles of silicon carbide (SiC) of example 7 (A). (left), B shows the SIC nanoparticles in the plateau borders.

The liquid foam was then heated to 70° C. during 3 minutes, during which cross-linking occurred. The structure quickly solidified. Thus, a solid foam, comprising nanoparticles was obtained as shown in FIG. 11.

Example 8 Cell Culture of HT29 Cells on Solid Chitosan Foams

The HT-29 cells, a human colon cancer cell line, were cultured in RPM1-1640 medium supplemented with 10% fetal bovine serum. Cells were sub-cultured, harvested and counted using standard protocols. T-75 flasks of HT-29 cells at ~90% of confluence were used, for all the reported experiments.

To prevent contamination, the 3D chitosan solid foam was sterilized as follows:
immersion of the foam in 70% ethanol for 2 h under UV light:
immersion of the foam in 10% penicillin streptomycin solution in PBS for 2 hours at room temperature.

After three washing cycles of the foam with PBS buffer, HT-29 cells suspension, at different concentrations were dripped on the foam using a micropipette (100 μL).

Figure 12:
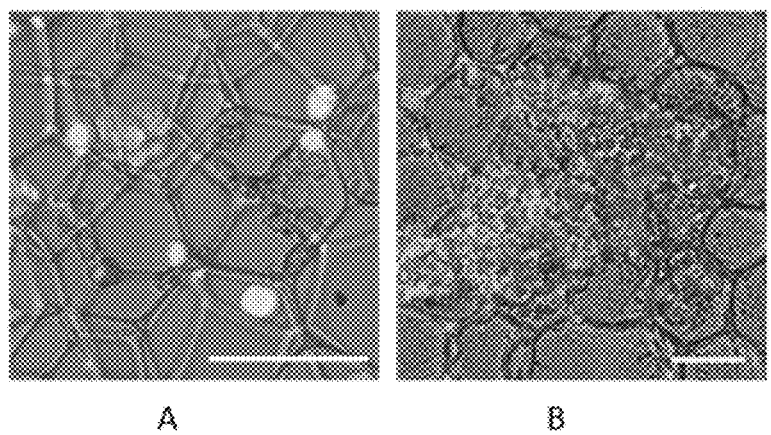
FIG. 12 represents the confocal images of HT29 cell culture on 3D solid chitosan foam of example 8, the scale bar being 100 µm. A represents the confocal images of said foam after 15 days, B represents the confocal images of said foam after 20 days.
Figure 13:
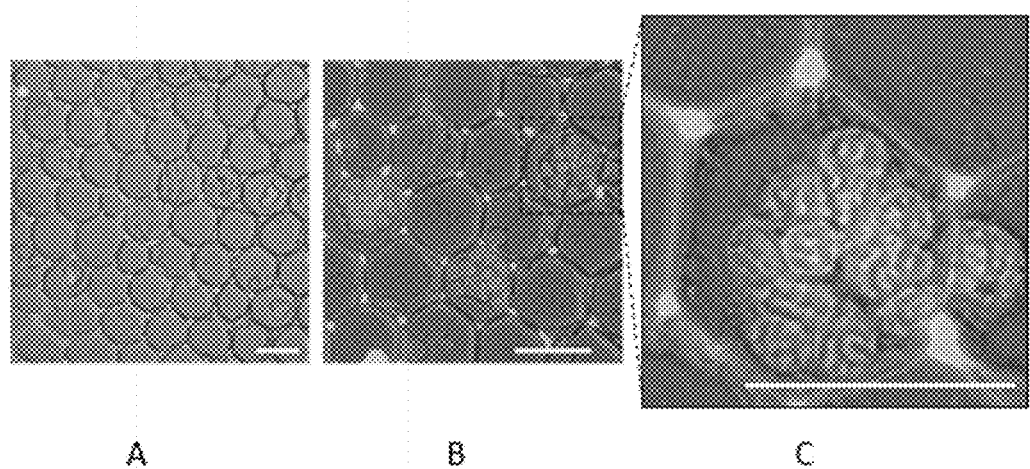
FIG. 13 represents the confocal images of HT29 cell culture on a single layer of solid chitosan foam after 20 days (example 8). The scale bar is 30 µm. A, B and C represent different magnifications.

After 10 min under laminar flow hood, the system was incubated in a 5% humidified $CO_2$ incubator at 37° C. After 24 and 48 hours of cells cultivation, live/dead staining was performed using fluorescent dyes: Calcein AM and Sytox orange nucleic acid stains at concentrations of 1 μM and 0.250 μM, respectively. Cells growth was then monitored for several days and images were acquired by using confocal microscopy. FIG. 12A and FIG. 12B show confocal images of the cell culture after 15 and 20 days respectively, confirming the biocompatibility of the 3D chitosan solid foams as scaffold for tissue engineering. It is worth noting that, in this case, cells were growing around the 3D foam structure. On the other hand, when a single layer foam with small pore size (30 μm) is used, cells tend to be confined inside the pores giving access to a wide range of vitro studies (for example in single-cell studies) (FIG. 13).

Example 9 Comparative Example—Preparation of a Foam without Cooling the Microchip A foam was prepared according to example 2, but without cooling the microchip.

Figure 14:
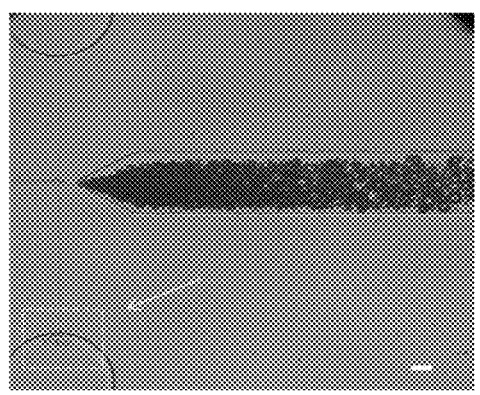
FIG. 14 represents an image showing flow destabilization because of clogging in the inlet channel, occurring during the experiment of comparative example 9.

Flow destabilization (the bubbles size gets bigger when they get further from the nozzle) occurred. This destabilization was the results of clogging in the bottom inlet channel where the crosslinking started inside the microfluidic device, as indicated in FIG. 14.

Example 10 Mechanical Studies

In order to determine the elastic modulus of the fabricated foams as in the example 2 above, compression tests were performed on different solid chitosan foams samples containing different concentrations of crosslinker (from 100 to 400 μL of Glyoxal in 1 mL of chitosan solution at 0.6% wt). An Instron 5865 universal testing machine with a 500 N load cell was used. The compression rate was 10 mm/min. The elastic modulus E was calculated as the slope of the linear elastic region (at low strain, under 15%) in the stress-strain curves.

Figure 16:
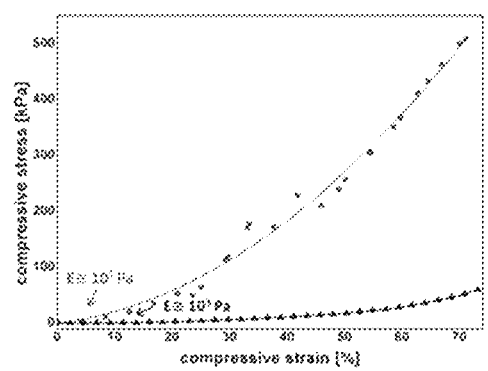
FIG. 16 represents compressive stress-strain curves of the foam sample (pore size of 100 µm) for two different cross-linker concentrations: at 100 µL of glyoxal (▲) and polynomial interpolation at 400 µL of glyoxal (■) for 1 mL of chitosan at 0.6 wt %.

The mechanical behavior of foam samples at different crosslinker concentrations under compression is showed in FIG. 16. As commonly observed with foams, different regions could be individuated in the curves. In order to estimate the elastic modulus E, the elastic region at low strain was taken into consideration. Results show that the elastic modulus E spans a range of two orders of magnitude (respectively from $10^3$ to $10^5$ Pa), by increasing the amount of crosslinker.

Consequently, it is noteworthy that the described microfluidic process allows a tuning of the mechanical properties.

The project leading to this application has received funding from the European Union's Horizon 2020 research and innovation program under grant agreement No 664823.

The invention claimed is:

1. A process of preparation of an organic solid three-dimensional polymeric foam comprising: a solid continuous phase and pores,
    wherein said solid continues phase is a cross-linked organic polymer,
    wherein said pores are separated by plateau borders, the meeting points of said plateau borders forming nodes,
    said solid three-dimensional polymeric foam:
        a pore size comprised from 50 nm to 100 μm,
        a volumetric fraction of the solid continuous phase comprised from 0.1 to 60%, with respect to the total volume of the foam,
        a polydispersity index comprised from 1 to 30%,
    wherein said solid three-dimensional polymeric foam is ordered over a volume of at least 100 pores,
        said process comprising:
        a step A of microfluidic bubbling of a gas phase through a liquid phase comprising a cross-linkable organic polymer, a cross-linking agent, a solvent and optionally a stabilizing agent, to obtain an organic liquid three-dimensional polymeric foam comprising a liquid continuous phase and bubbles, and
        a step B of cross-linking of said liquid three-dimensional polymeric foam comprising a liquid continuous phase and bubbles, to obtain an organic solid three-dimensional polymeric foam comprising a solid continuous phase and pores,
        said solid continuous phase being derived from the liquid phase, and said pores being derived from the bubbles,
        said step A of microfluidic bubbling being carried out at a temperature from 0° C. to lower than 15° C., said temperature being low enough to inhibit the cross-linking reaction,
        said step B of cross-linking being carried out after the step A of microfluidic bubbling and at a temperature comprised from 30 to 100° C., said temperature being high enough to trigger the cross-linking reaction,
        said step A of microfluidic bubbling and said step B of cross-linking being carried out in separate reactors, and
        step A being carried out in reactor A at a temperature from 0° C. to lower than 15° C. and step B being carried out in reactor B.

2. The process according to claim 1, wherein the size of the bubbles used during said step A of microfluidic bubbling is controlled by the flow-rates, or by the pressures of the gas and the liquid phases, by the formulation and by the characteristic dimension of reactor A,
    said flow rates of the gas and the liquid phases being comprised from 10 nL/min to 10 L/min,
    said pressures of the gas and the liquid phases being comprised from 10 mbar to 20 bar,
    said flow-rates being optionally varied during step A of bubbling, leading to the formation of from 1 to 10 populations of pores, or of from 2 to 10 populations of pores, or 1 or 2 populations of pores, each population of pores having a distinct pore size and polydispersity index,
    said pore size being comprised from 50 nm to 100 μm,
    said polydispersity index being comprised from 1 to 30%.

3. The process according to claim 1, comprising:
    a step A of microfluidic bubbling of a gas phase through a liquid phase comprising a cross-linkable polymer, a cross-linking agent, a solvent and optionally a stabilizing agent, to obtain an organic liquid polymeric foam comprising a liquid continuous phase and bubbles, and
    a step B of cross-linking of said liquid polymeric foam comprising a liquid continuous phase and bubbles, to obtain a first layer of solid polymeric foam comprising a solid continuous phase and pores in reactor B,
    and
    a sequence of leaving the previously prepared first layer of solid foam in reactor B, and repeating steps A and B to obtain a second layer of solid polymeric foam on top of the first layer of solid polymeric foam, thus increasing the total amount of the solid polymeric foam, to obtain a solid three-dimensional polymeric foam,
    said step B of cross-linking being carried out in such a way that cross-linking is only partial, ensuring adhesion between the first and second layers, and
    step A of said repeating steps A and B being optionally carried out using different reactors A, or using different microfluidic chips.

4. The process according to claim 1, further comprising:
    a step C of applying pressure to the liquid three-dimensional polymeric foam as obtained by step A, resulting in a compressed organic liquid three-dimensional polymeric foam, said pressure being comprised from 1.1 to 100 bar,
    said pressure being applied in reactor B,
    wherein the step B of cross-linking and the step C of applying pressure are optionally carried out simultaneously, resulting in simultaneous compression and cross-linking of said liquid three-dimensional polymeric foam, to obtain an organic solid three-dimensional foam.

5. The process according to claim 1, wherein the cross-linkable organic polymer is chosen from:
    biopolymers, or polysaccharides,
    polyvinyl alcohols polylactic acids (PLA), Poly-L-Lactic acids (PLLA), poly(lactic-co-glycolic acids) (PLGA), polyethylene glycols (PEG),
    polyacrylates (PA), polymethacrylates (PMA), Poly(methyl methacrylates) (PMMA), polystyrenes (PS), poly-N-vinylpyrrolidones (PVP), Polyethyleneglycol acrylates (PEGA), polyethyleneglycol methacrylates (PEGMA), polyethyleneglycol diacrylates (PEGDA), polyethyleneglycol dimethacrylates (PEGDMA),
    or mixtures of said organic polymers,
and wherein the cross-linking agent is chosen from the group of:
    glycerol-phosphate disodium salt, glyoxal, genipin, sodium tripolyphosphate (TPP), divinyl sulfone (DVS), calcium chloride ($CaCl_2$)), calcium acetate, glutaraldehyde, polyaldehydes and butanediol glycidyl ether,
    or mixtures of said cross-linking agents.

6. The process according to claim 1, wherein the cross-linkable organic polymer is chitosan and the cross-linking agent is glyoxal.

7. The process according to claim 1, wherein the stabilizing agent is a surfactant, chosen from the group consisting of:
sodium dodecyl sulfate, sodium laureth sulfate, ammonium lauryl sulfate, and sodium palmitate,
decyl glucoside, poloxamers, and polyethylene glycol-based surfactants, coco glycoside, lauryl glycoside, polysorbate-20, or cetyl alcohol, and lauryl alcohol,
quaternary ammonium salts,
cocamidopropyl betaine, sodium lauroamphoacetate, and sodium cocoyl glutamate.

8. The process according to claim 1, wherein the liquid phase further comprises:
nanoparticles, or
an active pharmaceutical ingredient, or
a contrast agent, or
a dye,
said active pharmaceutical ingredient optionally comprising a radiotracer,
said nanoparticles, active pharmaceutical ingredient, contrast agent or dye being optionally coupled to a fluorophore.

9. The process according to claim 1, wherein the liquid phase further comprises:
nanoparticles, chosen from the group of:
metal oxide nanoparticles, or titanium dioxide ($TiO_2$) or aluminum oxide ($Al_2O_3$) nanoparticles,
metallic nanoparticles, or silver (Ag), gold (Au), iron (Fe), nickel (Ni), copper (Cu) or
germanium (Ge) nanoparticles,
bi-metallic nanoparticles, or gallium arsenide (GaAs), lead telluride (PbTe), or iron platinum (FePt) nanoparticles,
tri-metallic nanoparticles, or aluminum gallium arsenide ($Al_xGa_{1-x}As$) nanoparticles,
ceramic nanoparticles, or silicon carbide (SiC) or tungsten carbide (WC) nanoparticles,
magnetic nanoparticles, or iron oxide ($Fe_2O_3$) nanoparticles,
silica ($SiO_2$) nanoparticles,
polymeric nanoparticles,
or mixtures thereof,
or
an active pharmaceutical ingredient, chosen from the group of:
anti-inflammatory drugs, or diclofenac, ibuprofen, acetyl salicylic acid, or steroid based anti-inflammatory drugs,
anti-cancer drugs, or paclitaxel, docetaxel, or doxorubicin,
analgesics, or morphine,
antibiotics, or penicillin or sulfonamide antibiotics,
said active pharmaceutical ingredient optionally comprising a radiotracer,
or
a contrast agent or ipodate sodium,
or
a dye, or an organic dye, or a water soluble organic dye, pigments, or quantum dots, or a dye chosen from the group consisting of:
Fluorescein, Eosin, Amaranth, Sanolin Blue NBL, Anthocyanins, methylene blue, indocyanine green (ICG), Rhodamine B, Cyanine, Evans Blue, Primulin, Isamine Blue, and Naphtol green B,
said nanoparticles, active pharmaceutical ingredient, contrast agent or dye being optionally coupled to a fluorophore.

* * * * *